US 12,491,543 B2

(12) United States Patent
Mehlenbacher

(10) Patent No.: US 12,491,543 B2
(45) Date of Patent: Dec. 9, 2025

(54) REMEDIATION OF EXCAVATED PIPE SECTIONS

(71) Applicant: LMC Industrial Contractors, Inc., Dansville, NY (US)

(72) Inventor: Lawrence D. Mehlenbacher, Wayland, NY (US)

(73) Assignee: LMC Industrial Contractors, Inc., Dansville, NY (US)

( * ) Notice: Subject to any disclaimer, the term of this patent is extended or adjusted under 35 U.S.C. 154(b) by 113 days.

(21) Appl. No.: 18/441,429

(22) Filed: Feb. 14, 2024

(65) Prior Publication Data
US 2024/0181504 A1 Jun. 6, 2024

Related U.S. Application Data

(62) Division of application No. 16/675,916, filed on Nov. 6, 2019, now Pat. No. 11,945,010.

(60) Provisional application No. 62/756,343, filed on Nov. 6, 2018.

(51) Int. Cl.
*B08B 9/023* (2006.01)
*B01D 27/00* (2006.01)
*B01D 46/00* (2022.01)

(52) U.S. Cl.
CPC .............. *B08B 9/023* (2013.01); *B01D 27/00* (2013.01); *B01D 46/00* (2013.01); *B01D 2279/35* (2013.01)

(58) Field of Classification Search
CPC ...................................... B08B 9/023
See application file for complete search history.

(56) References Cited

U.S. PATENT DOCUMENTS

| 4,552,594 | A | | 11/1985 | van Voskuilen et al. |
| 5,016,314 | A | | 5/1991 | Green et al. |
| 5,092,357 | A | | 3/1992 | Chapman et al. |
| 5,199,226 | A | | 4/1993 | Rose |
| 5,209,245 | A | | 5/1993 | Chapman et al. |
| 5,267,417 | A | * | 12/1993 | Rose ............... B24C 3/32 451/38 |
| 5,398,461 | A | | 3/1995 | Rose |
| 5,437,296 | A | | 8/1995 | Citino |
| 5,470,458 | A | | 11/1995 | Ripley et al. |

(Continued)

FOREIGN PATENT DOCUMENTS

| CA | 2613425 A1 * | 5/2009 | ............ B08B 9/023 |
| EP | 0962263 A2 | 12/1999 | |
| RU | 2372439 C1 * | 11/2009 | |

OTHER PUBLICATIONS

Howell (2011) "Considering Asbestos And Old Pipelines," pgjonline.com, 5 pages.

(Continued)

*Primary Examiner* — Omair Chaudhri
(74) *Attorney, Agent, or Firm* — Harter Secrest & Emery LLP; Timothy W. Menasco, Esq.

(57) ABSTRACT

A system and method for removing a coating from an excavated pipe section includes impacting liquid jects against the coating and collecting a mixture of the liquid and debris of the removed coating. The mixture is subjected to active separation and passive separation to capture the debris, wherein the debris can be appropriately disposed.

16 Claims, 34 Drawing Sheets

(56) References Cited

U.S. PATENT DOCUMENTS

| | | | |
|---|---|---|---|
| 5,474,097 A * | 12/1995 | Lowe | E21B 17/006 134/167 C |
| 5,615,696 A * | 4/1997 | Lawler | B08B 9/023 134/172 |
| 6,461,231 B1 * | 10/2002 | Taylor | B08B 9/023 451/92 |
| 11,065,651 B1 | 7/2021 | Awad | |
| 2003/0155002 A1 * | 8/2003 | Vazquez | B01D 17/10 134/108 |
| 2004/0231703 A1 * | 11/2004 | McCormick | B60S 3/00 134/10 |
| 2005/0139243 A1 | 6/2005 | Hay et al. | |
| 2005/0281953 A1 | 12/2005 | Carroll | |
| 2006/0111022 A1 * | 5/2006 | Sela | B08B 9/023 451/87 |
| 2006/0169302 A1 | 8/2006 | Kozy et al. | |
| 2006/0174434 A1 | 8/2006 | Heumann et al. | |
| 2006/0185691 A1 | 8/2006 | Joseph | |
| 2007/0246087 A1 | 10/2007 | Crawford et al. | |
| 2007/0256839 A1 * | 11/2007 | Moynahan | E21B 17/006 166/312 |
| 2008/0110476 A1 | 5/2008 | Amestoy et al. | |
| 2010/0294314 A1 | 11/2010 | Daleside | |
| 2011/0030740 A1 * | 2/2011 | Bamford | B08B 3/024 134/115 G |
| 2012/0145192 A1 | 6/2012 | MacKinnon | |
| 2012/0272897 A1 * | 11/2012 | Bamford | B05B 13/0421 118/500 |
| 2013/0117959 A1 | 5/2013 | Stryker et al. | |
| 2014/0093348 A1 | 4/2014 | Thomas et al. | |
| 2014/0238643 A1 | 8/2014 | Hains et al. | |
| 2016/0114362 A1 * | 4/2016 | Foat | B05B 13/0436 134/99.1 |
| 2016/0199890 A1 | 7/2016 | Yates et al. | |
| 2017/0303777 A1 | 10/2017 | Takada | |
| 2017/0343308 A1 | 11/2017 | Wojciechowski, III et al. | |
| 2017/0361812 A1 | 12/2017 | McCormick et al. | |
| 2018/0020905 A1 | 1/2018 | Chouinard et al. | |
| 2018/0155866 A1 | 6/2018 | Brennan et al. | |
| 2018/0283406 A1 | 10/2018 | Rivard | |
| 2020/0001334 A1 | 1/2020 | Ngo et al. | |
| 2020/0139555 A1 | 5/2020 | Paterni | |

OTHER PUBLICATIONS

Jorgensen Conveyors, Inc. (Rev. Feb. 2017) "Roll Media Filters," 4 pages.
Simpson (2017) "The Importance of a Pressure Relief Valve," High Priority Plumbing and Services, pp. 2-3.

* cited by examiner

REMEDIATION OF EXCAVATED PIPE SECTIONS

BACKGROUND OF THE INVENTION

Field of the Invention

The present disclosure generally relates to the remediation of excavated pipe sections and more particularly to systems and methods for the removal, retention and collection for disposal of potentially hazardous material from an exterior surface of the pipe section.

Description of Related Art

Oil and gas transmission pipelines of large diameter (e.g. 12 inches to 60 inches) are typically coated before being buried. These coatings are applied to reduce corrosion of the buried pipe section. A coal tar based product was often applied as the coating, wherein additional materials such as polyethylene tape and asbestos were incorporated into the coating.

As pipelines age, replacement is required. However, the coatings on the pipe sections limit the ability to recycle the metal of the excavated pipe sections. Thus, because of the potentially hazardous material of the coatings, the pipe sections must be cleaned prior to recycling.

Because the cleaning involves potentially hazardous materials, the cleaning must be a in controlled manner, wherein the removed coating is properly contained and disposed.

Therefore, a need exists for the removal of hazardous materials from the external surface of pipe sections, wherein the removed material can be readily contained and transported to proper disposal facilities.

BRIEF SUMMARY OF THE INVENTION

In one configuration, the present disclosure provides an apparatus for cleaning an exterior surface of a pipe section, wherein the apparatus includes an enclosure defining an interior, the interior sized to enclose at least a portion of the section of pipe, the enclosure including a sump defining a debris retention surface; a spray head having at least one nozzle, where the nozzle is configured to form a pressurized liquid stream to impact the exterior surface of the portion of the section of pipe to remove at least a portion of the coating from the exterior surface and form a mixture of the liquid and entrained debris; a liquid filtration system fluidly connected to the sump, the liquid filtration system having a filter media configured to remove a portion of the entrained debris from the mixture to form a liquid stream; and a conveyor having a first portion and a spaced apart second portion, the first portion located along at least a portion of the debris retention surface of the sump, and the second portion being external to the sump, such that the conveyor transports debris from the sump.

In a further configuration, the present disclosure provides an apparatus for cleaning an exterior surface of a pipe section, wherein the apparatus includes an enclosure defining an interior, the interior sized to enclose at least a portion of the section of pipe, the enclosure including a sump defining a debris retention surface; a nozzle box; a spray head at least partly enclosed by the nozzle box, the spray head having a plurality of nozzles, each of the plurality of nozzles configured to form a pressurized liquid stream to impact the exterior surface of the portion of the section of pipe to remove at least a portion of the coating from the exterior surface and form a mixture of the liquid and entrained debris; a liquid filtration system fluidly connected to the sump, the liquid filtration system having a disposable filter media configured to remove a portion of the entrained debris from the mixture and form a liquid stream; a disposal bin for retaining debris for disposal; and a conveyor extending from a first portion located along at least a portion of the debris retention surface of the sump, to a second portion external to the sump, the conveyor transporting debris from the sump.

In one configuration, the debris retention surface is a bottom of the sump. It is further contemplated the liquid filtration system can be located to deposit the disposable filter media into the disposal bin. The apparatus can also include a robotic arm connected to the nozzle box, the robotic arm moving the nozzle box relative to the pipe section. An air filtration system can be connected to the interior of the enclosure, wherein the air filtration system creates a negative pressure in the interior of the enclosure and exhausts the air through a series of filters to the ambient atmosphere.

In one configuration, the system can also include at least one trailer, wherein the enclosure, as well as the high pressure spray system, the active separation system and the air filtration system are connected to the trailer for movement with the trailer.

The present disclosure further discloses a method including the steps of impacting a pressurized liquid stream against an exterior surface of a pipe section located within an enclosure to form a mixture having entrained debris, wherein the mixture flows to a sump, the sump including a debris retention surface; extracting a portion of the mixture from the sump; passing the extracted portion of the mixture through an active filter to capture a portion of the entrained debris on a filter media; and engaging a conveyor with debris accumulated on the debris retention surface and transporting the accumulated debris from the sump.

BRIEF DESCRIPTION OF THE SEVERAL VIEWS OF THE DRAWING(S)

DETAILED DESCRIPTION OF THE INVENTION

Figure 1:
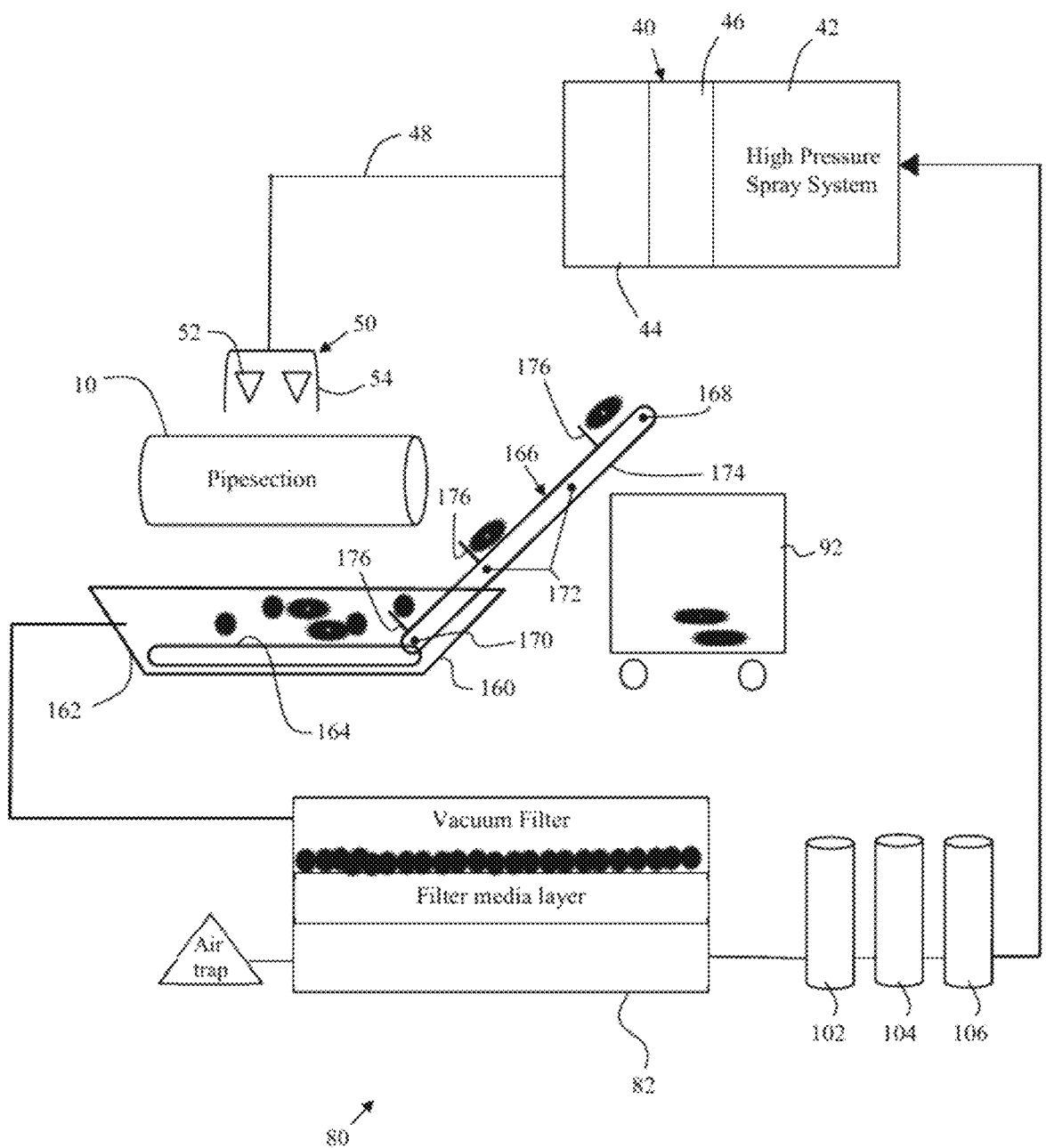
FIG. 1 is a schematic of the present system for removing coatings from excavated pipe sections.
Figure 2:
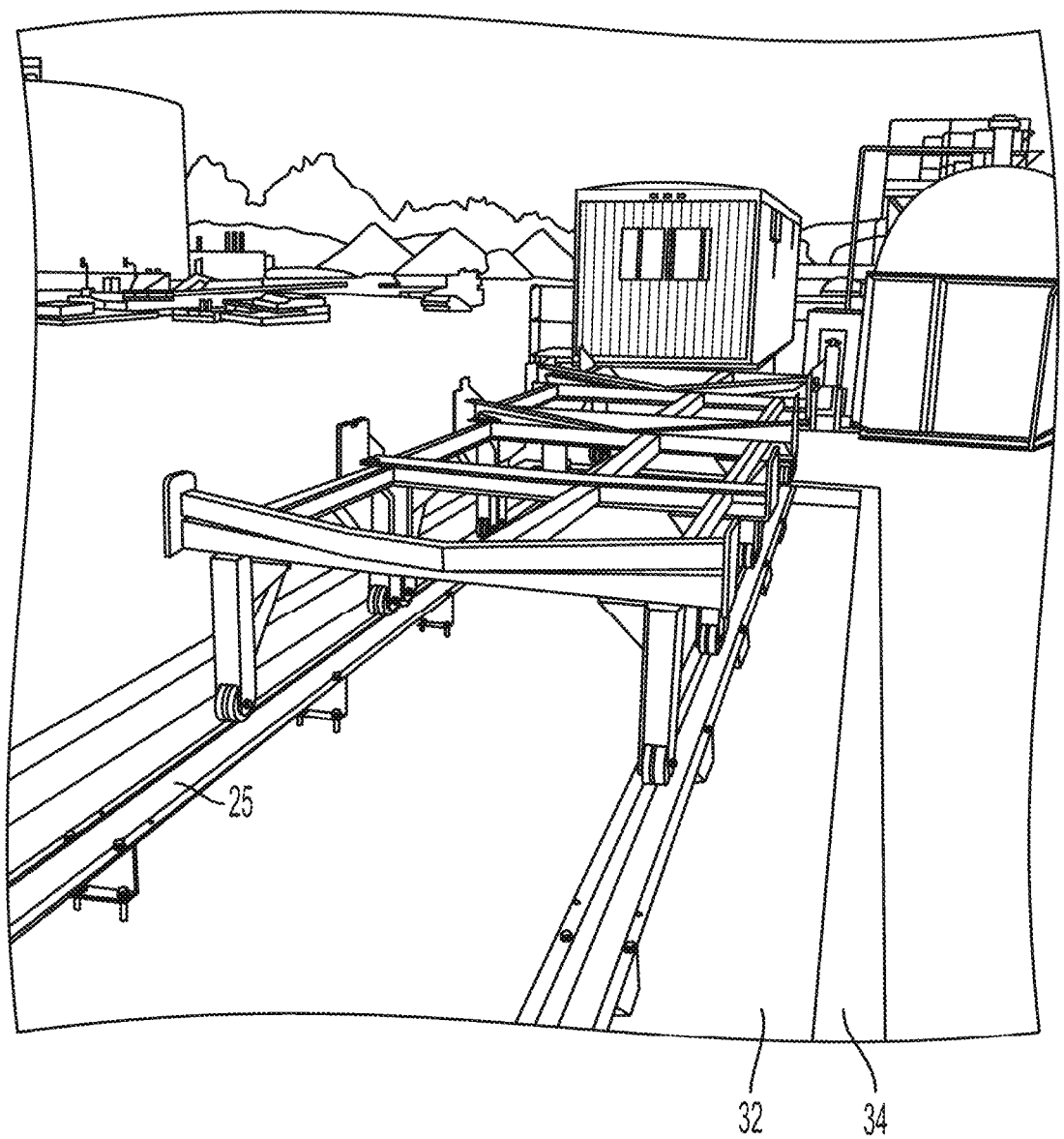
FIG. 2 is a perspective view of a preparation pad for receiving a pipe section to be cleaned.
Figure 3:
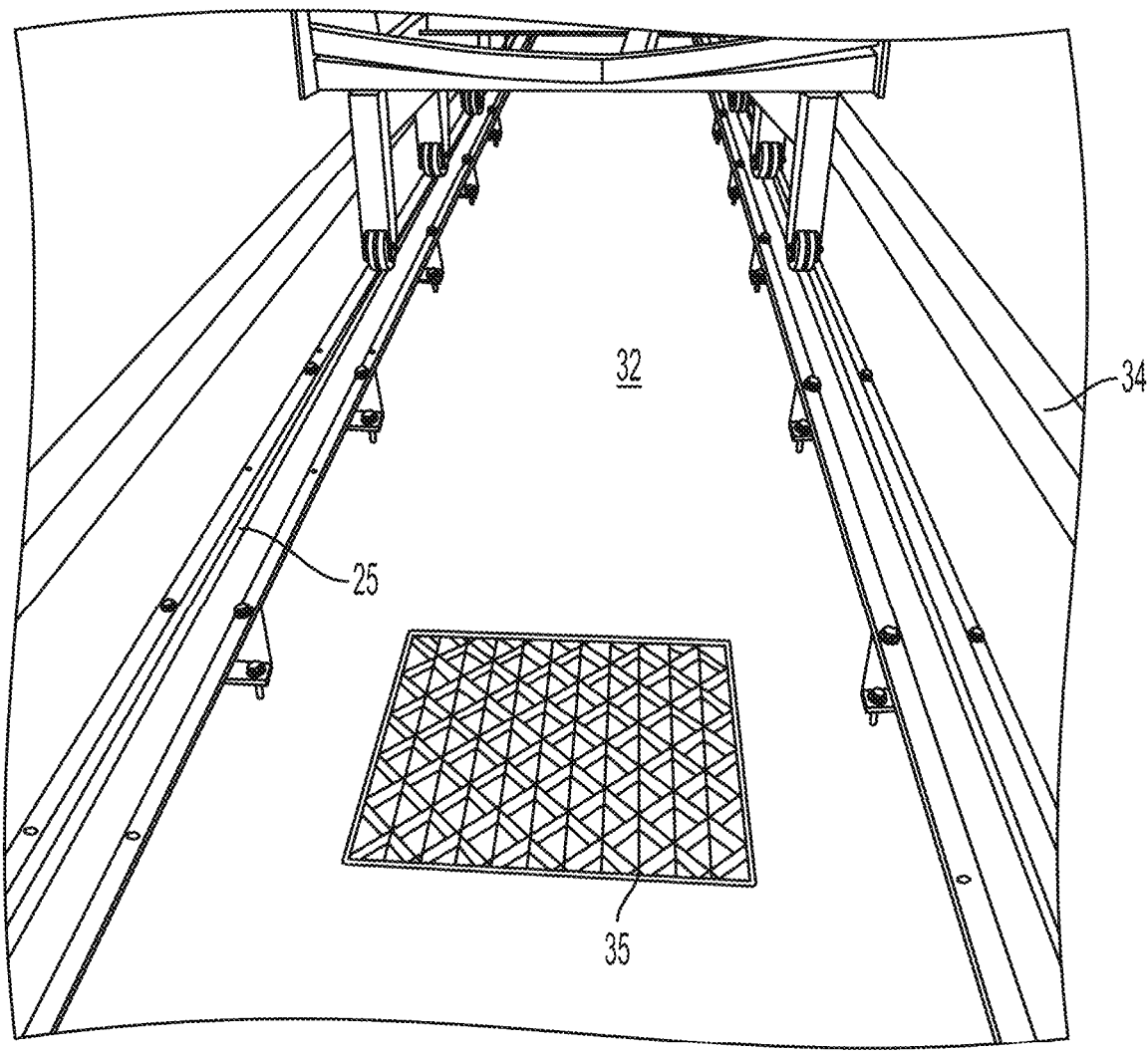
FIG. 3 is a perspective view of a portion of the preparation pad of FIG. 1.

The present system provides a method and structure for the selective removal of a coating on an exterior surface of a pipe section 10 by liquid jets, such as but not limited to water jets, wherein the removed coating becomes debris and is subsequently separated from the water by active separation and passive separation, collected and retained for proper disposal. Thus, the present system provides for the efficient removal from the pipe section 10, containment, separation from the water and packaging of coatings for proper disposal.

Although the term "water" is in the description, it is understood the water is merely an example of a liquid that can be used in the system. The liquid can be any of a variety of compositions. However, in view of the advantage of water or water based liquids the present description is set forth in terms of water. The term water encompasses substantially filtered, filtered, potable or gray water. However, it is understood the water can include various additives for performance, such as anti-foaming or lubricants. In one configuration, the additives are selected to minimize damage to the high pressure spray system.

As used herein, the term "pipe section" means a length of pipe removed from the ground. The pipe section extends along a longitudinal axis and can have any of a variety of lengths, wherein lengths of 8 feet to 60 feet or more are typical. The pipe section can be any of a variety of diameters, wherein diameters of 8 inches to 40 inches are typical.

In the present system, upon operable impact of the water jets with the coating on the exterior surface of the pipe section 10, a mixture is formed of the impacted spray water and the removed material of the coating as debris within the mixture. The mixture thus includes non-settling debris (typically less than 1 mm/sec) as well as settling debris, wherein the settling debris may have dimensions of 0.25 inches or more, such as 3 inches or 6 inches or more. Thus, for purposes of the present description, the term mixture means the spray wash with entrained debris including at least one of settling and non-settling debris (particles).

The coating on the exterior surface of the excavated pipe section can be any of a variety of materials, but a coal tar enamel (CTE) coating has been widely used for buried pipelines. It is believed that hundreds of thousands of miles of steel pipeline has the CTE coating. Depending on the age of the pipe section 10, the coatings were initially simple mixtures of crude pitches and solvents. Subsequently, coal tar liquors were obtained from high-temperature coke ovens and refined to provide stable soft pitches that were used as the basis for CTE. Special powdered coals were dispersed at high temperatures in these soft pitches and with heavy coal tar flux oils to make a plasticized product called modulate. A further development included the addition of fillers such as powdered talc or slate as well as asbestos. The coatings can include bituminous asphalt as well as multi-coat exterior and interior paints, polyurethane, and tape wrapping.

For typical 40 foot pipe sections 10 having a 30 inch diameter, the pipe section weighs approximately 140 to 150 lbs/ft, wherein the coating is approximately 2-3 lbs/ft. Thus, there an excavated pipe section 10 can represent a significant source of recyclable material. However, as set forth above, the metal must be separated from the potentially hazardous materials of the coating prior to recycling. As the coatings can be approximately 2-3% of the weight of the pipe section 10, the removed coatings represent a significant complication to recycling the pipe section.

Figure 26:
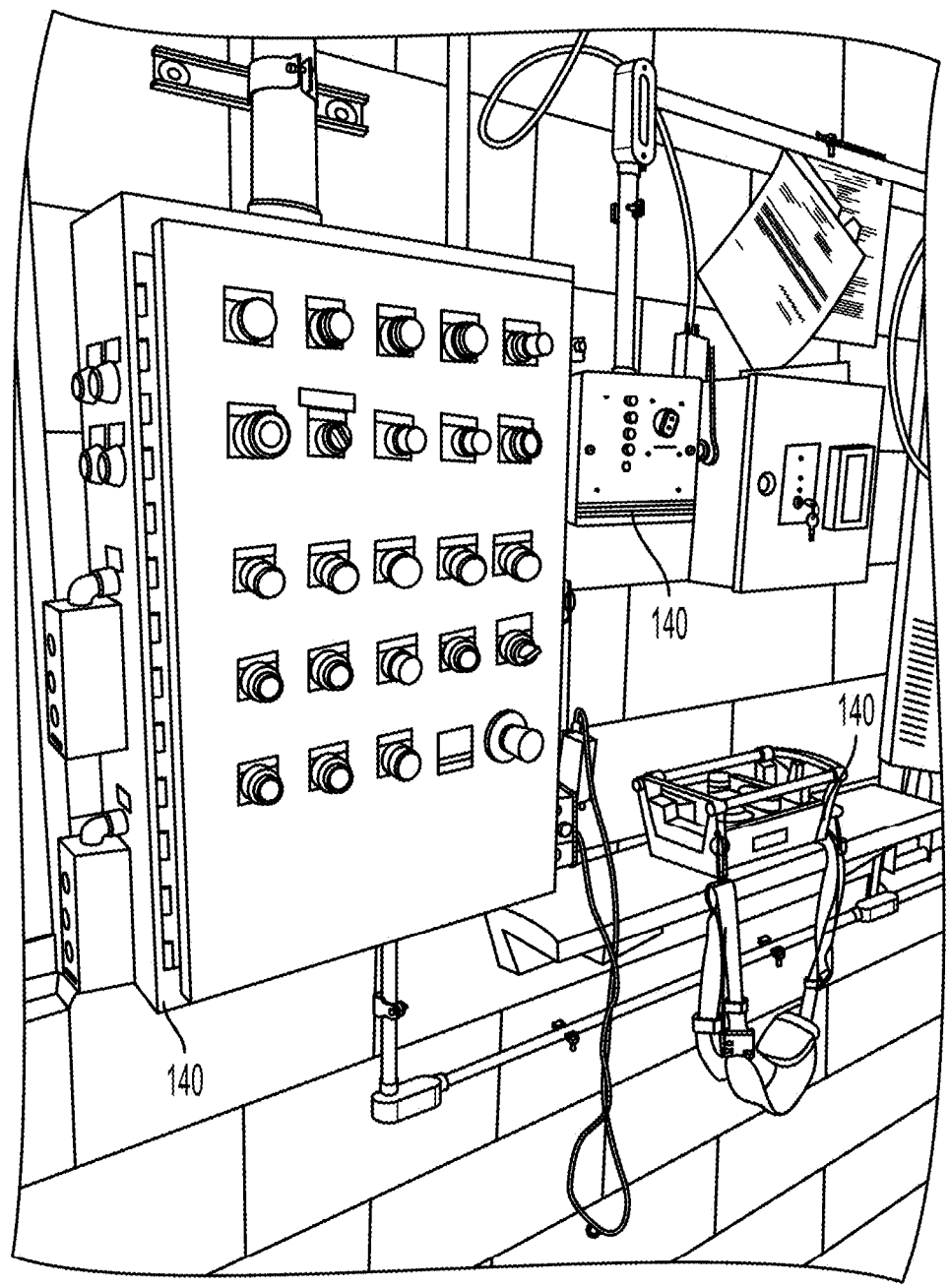
FIG. 26 is a perspective view of a portion of a control panel for operating the system.
Figure 27:
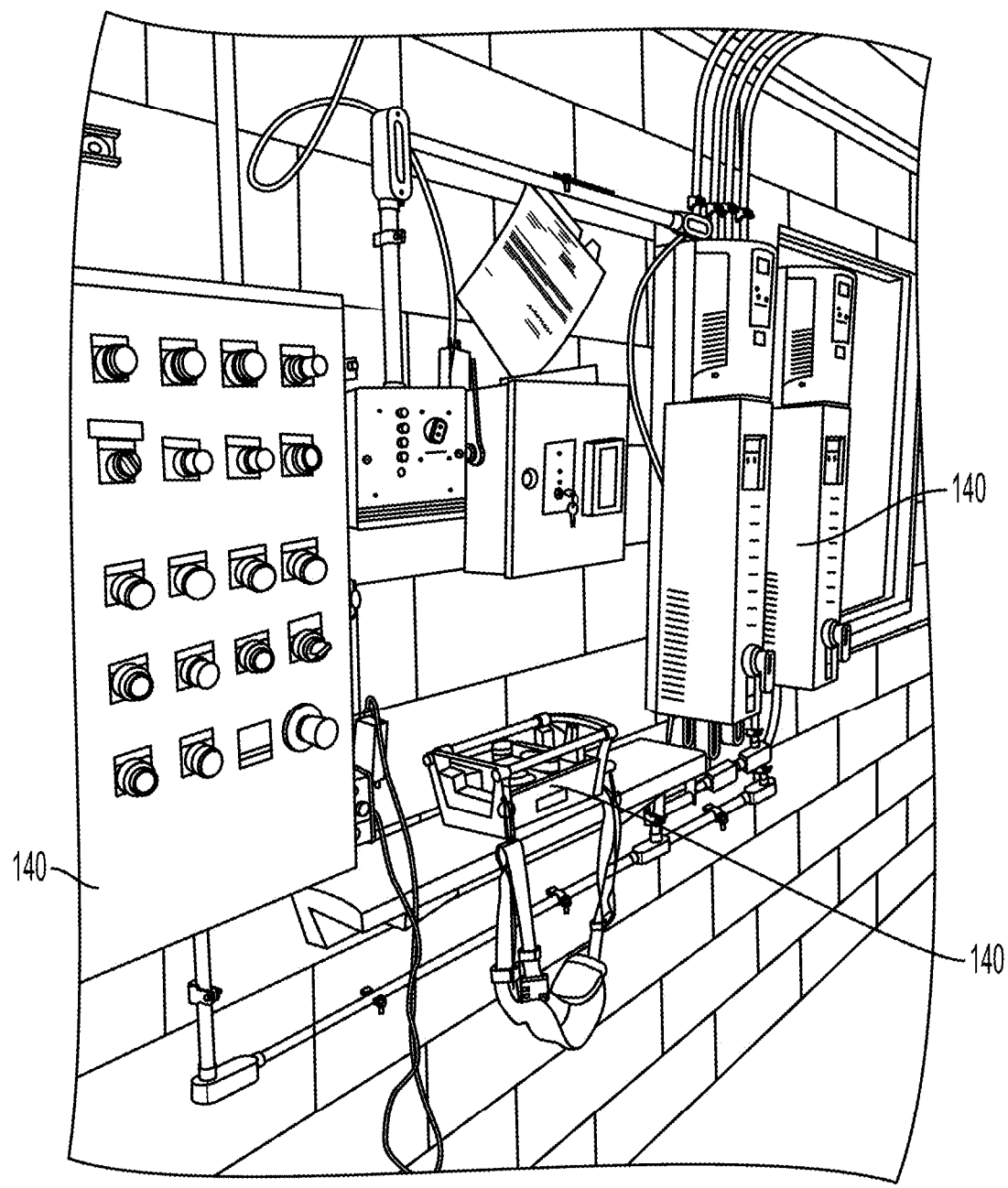
FIG. 27 is another perspective view of a portion of a control panel for operating the system.
Figure 28:
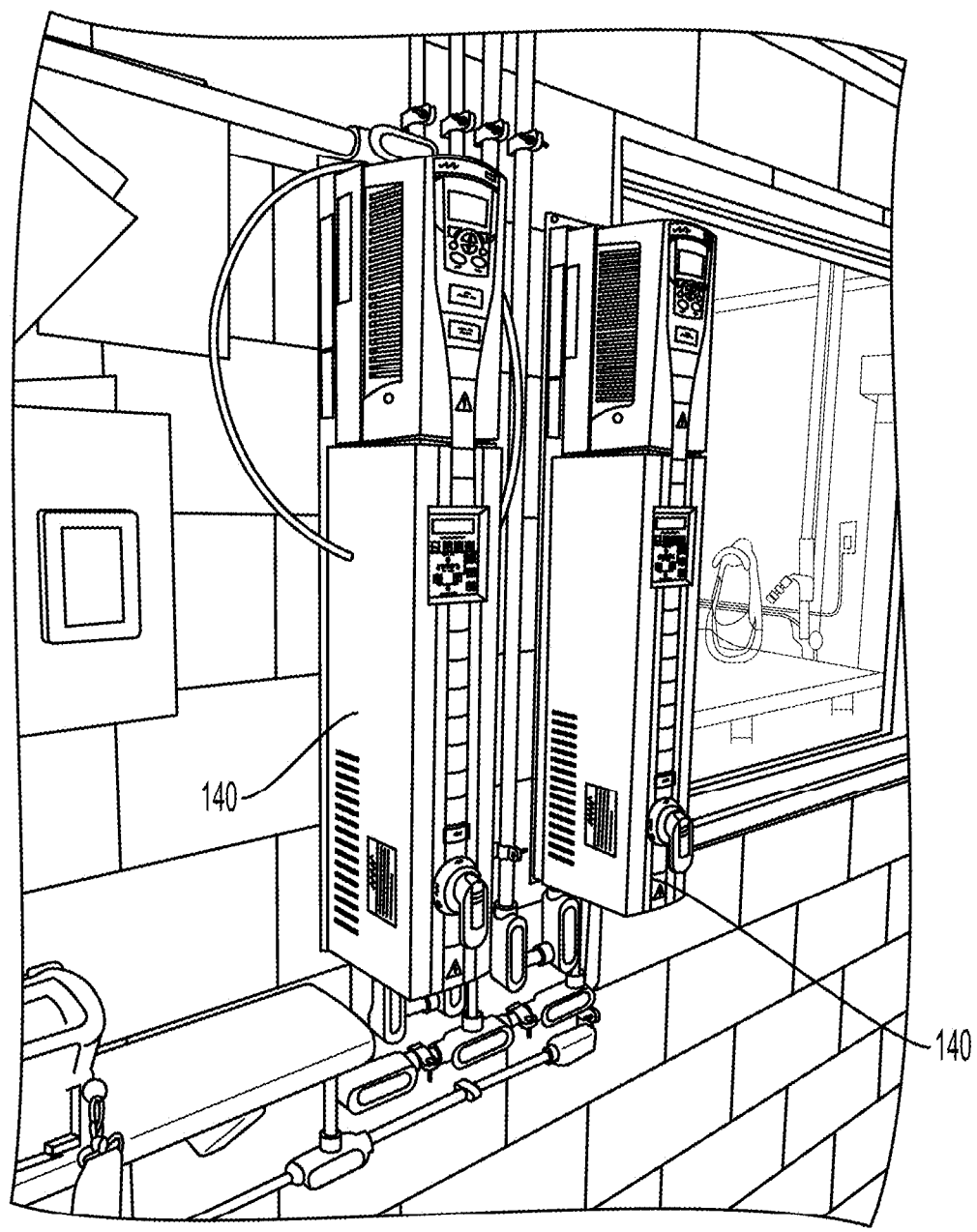
FIG. 28 is another perspective view of a portion of a control panel for operating the system.

Referring to FIG. 1, the present system includes an enclosure 20, a high pressure spray system 40, an active separation system 80, a passive separation system 120, a sump 160 and in certain configurations an air filtration system 180. A controller 140 is operably connected to the high pressure spray system 40 and in certain configurations to the active separation system 80 as well as the air filtration system 180. The controller 140 is located outside the enclosure 20 and can thus provide for remote control of the system. As seen in FIGS. 26-28, the controller 140 can include a plurality of control panels for operating the system. The control panels include a portable panel allowing the operator to inspect the enclosure from a variety of viewing locations.

The enclosure 20 is sized for enclosing the pipe section 10 or portion of the pipe section to be cleaned. That is, the entire length of the pipe section 10 or just a portion of the pipe section can be enclosed. The enclosure 20 is configured to provide for containment of the water jet and debris of the removed coating. In select configurations, as set forth below, the enclosure 20 is sealable to enable the creation of a negative pressure in the enclosure so that air flow can be controlled and filtered before release to the ambient atmosphere.

Figure 24:
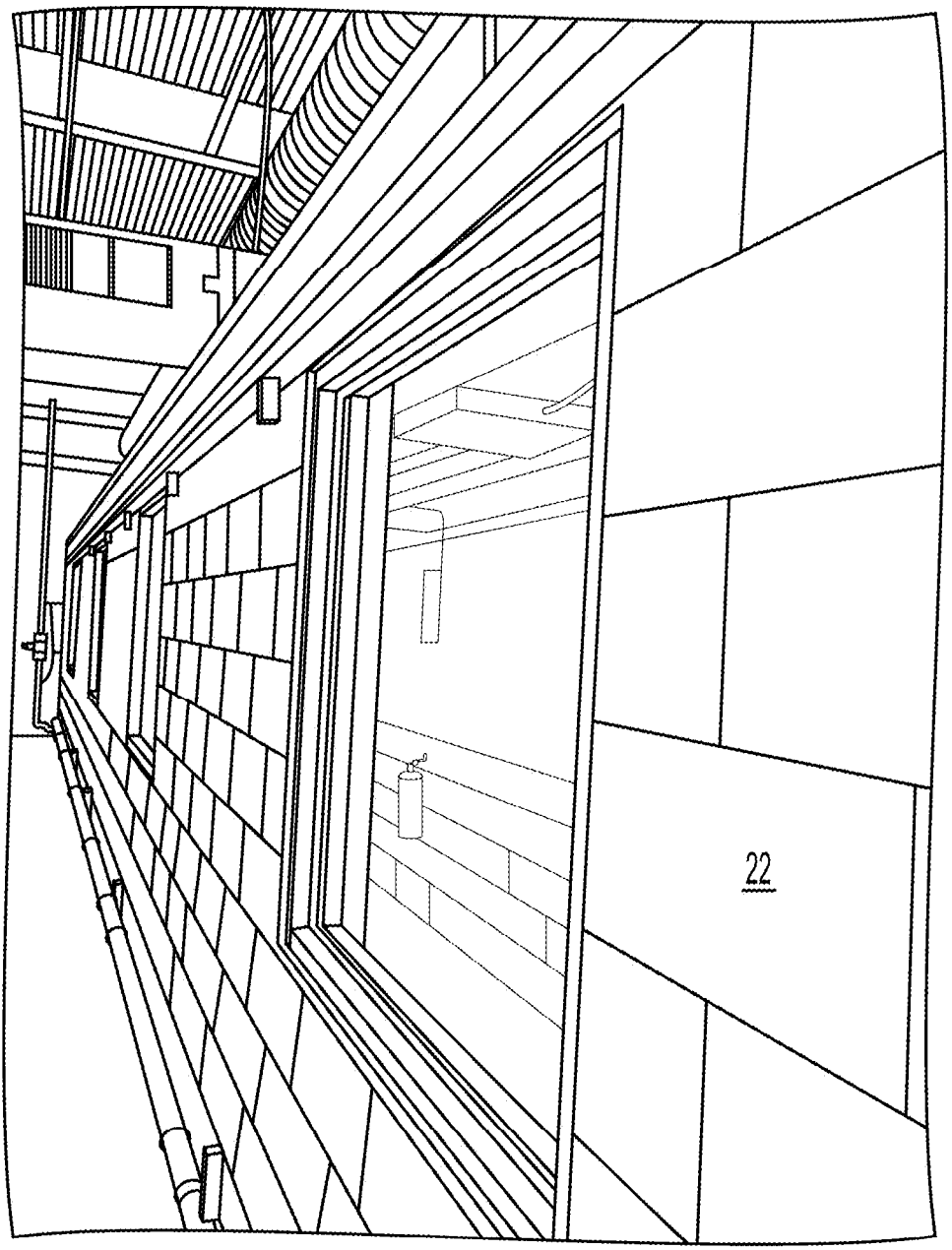
FIG. 24 is a perspective view of a portion of the enclosure with windows for permitting visual interaction from the operator.
Figure 25:
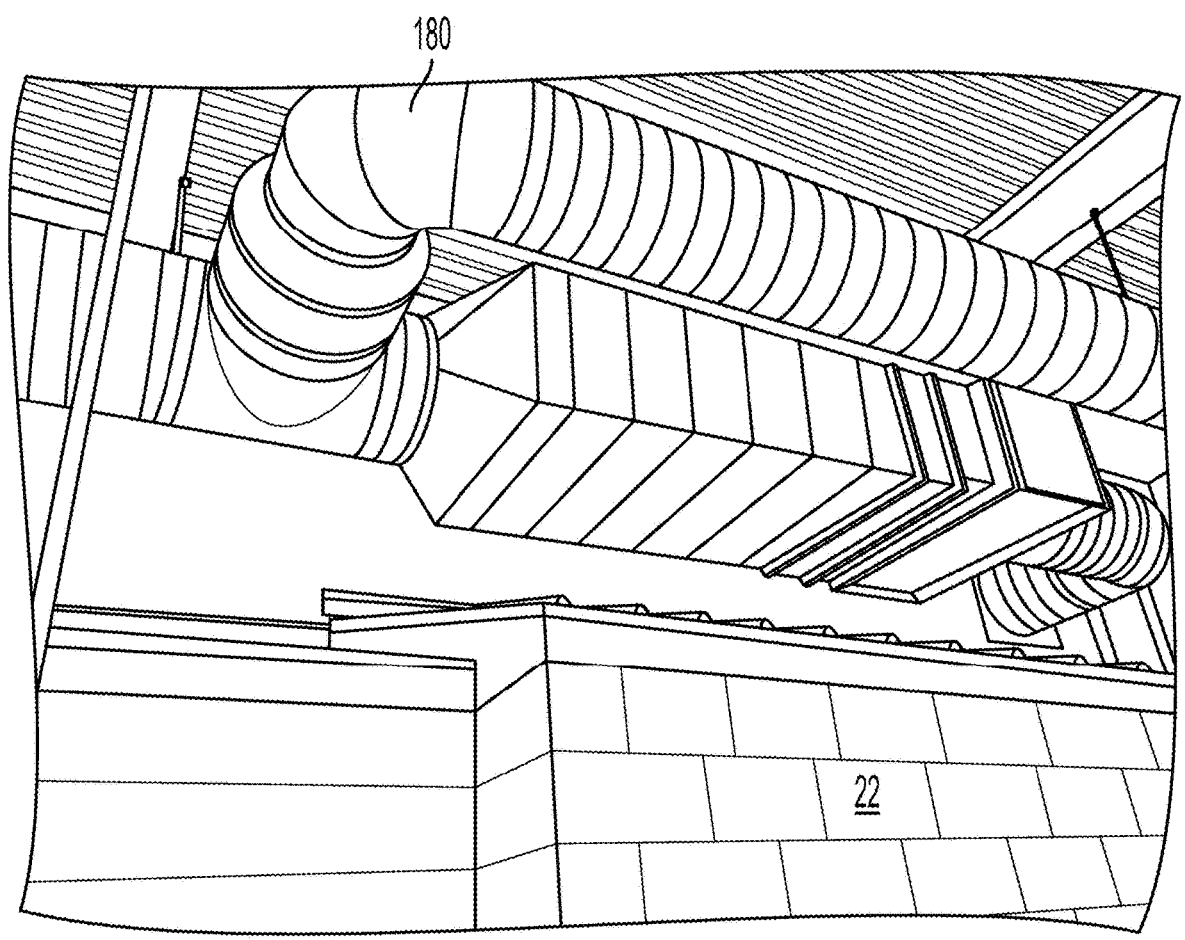
FIG. 25 is a perspective view of a portion of an air handling unit in the enclosure.

In one configuration, the enclosure 20 is a building 22 having a dedicated pad 24 and permanent connection to utilities. It is contemplated the building 22 can include or define a bay 26 in which the spray system and sump are located. As seen in FIG. 24, the enclosure 20 can include at least one window for permitting visual interaction from the operator from a location outside the enclosure. Thus, the operator need not be exposed to the debris as the system is operated and controlled.

A set of rails 25 can extend from outside to inside the building 22. The rails 25 can be sized to the particular building 22 or can be a standard commercial rail gauge. Depending on the specific configuration of the building 22, or bay 26, the set of tracks or rails 25 can be used to introduce and extract the pipe section 10 from the building 22.

Figure 36:
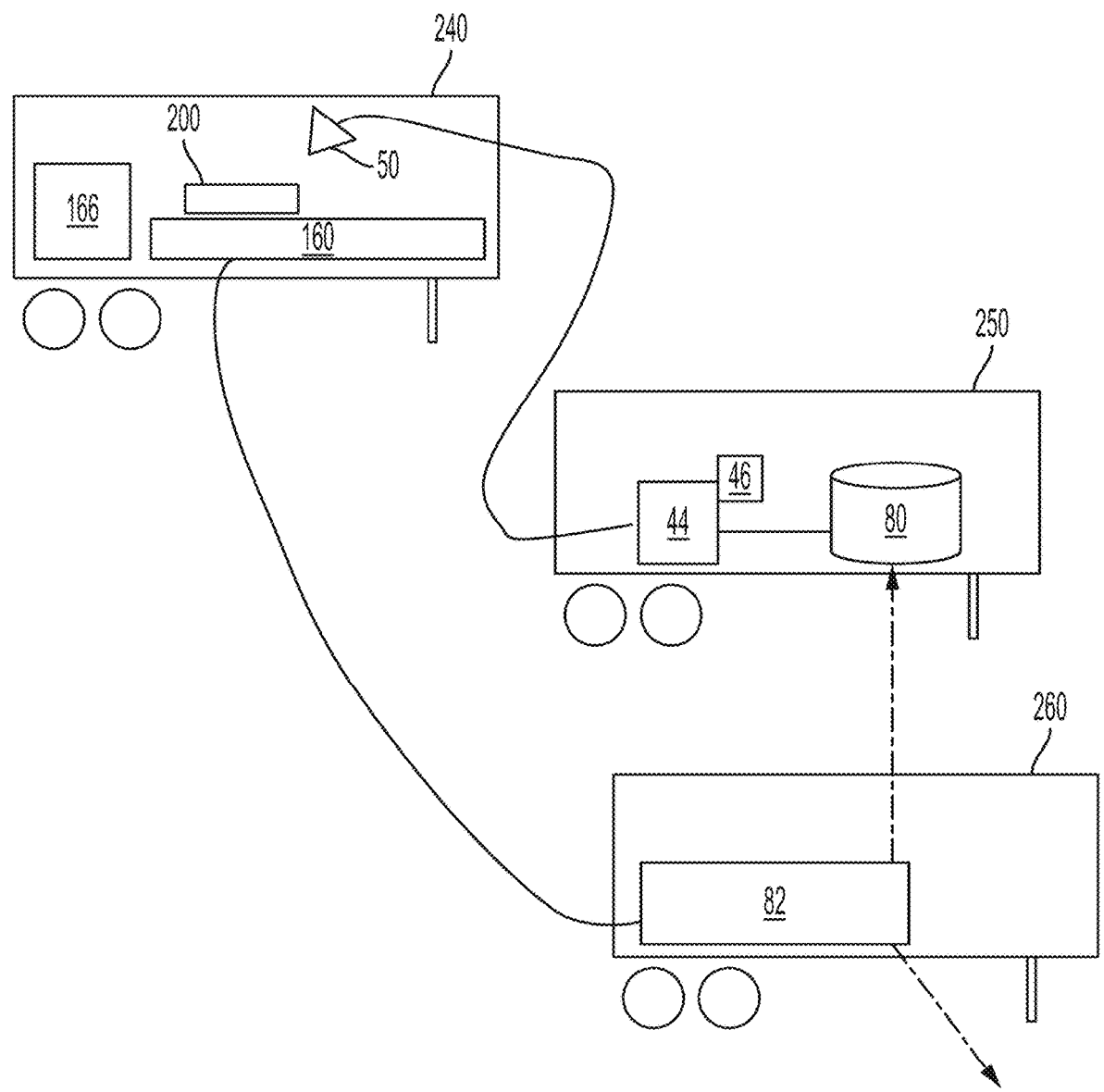
FIG. 36 is a schematic of a portable configuration of the system.

In a portable configuration seen in FIG. 36, the enclosure 20 is disposed upon a semi-trailer 240. In one version of the portable configuration, the semi-trailer has dimensions to allow over the road transit without requiring special permitting. Thus, the semi-trailer can have dimensions of approximately 13 ft 6 in. (4.11 m)×53 ft 0 in., such as set forth in Federal Size Regulations for Commercial Motor Vehicles, U.S. Department of Transportation, Federal Highway Administration, 2018.

In the building configuration, the building 22 has at least one door 28, moveably between an open position and a closed position, for permitting introduction of the pipe section 10, or portion of the pipe section and extraction of the pipe section or portion of the pipe section. In one version of this configuration, the building 20 includes the bay 26 which receives the pipe section 10, wherein the bay can be sufficiently sealed to create a sufficient negative pressure within the bay so as to effectively isolate the bay. In some configurations, the negative pressure is at least a minimum 0.01-inch WC (water column) negative-pressure. The exhausted air from the bay 26 is passed through the air filtration system 180 having known in the art air filters, and separators as necessary, to permit discharge of the filtered air to the ambient environment in compliance with local, state and federal regulations.

Specifically, the air filtration system 180, can include an handling unit 182 which is fluidly connected to the bay 26 to generate a negative pressure in the bay, wherein the air is passed through filters, as known in the art, to permit discharge into the ambient environment. The air handling unit 182 can include commercially available replaceable or cleanable media, filters, 184 for capturing airborne contaminants.

Figure 29:
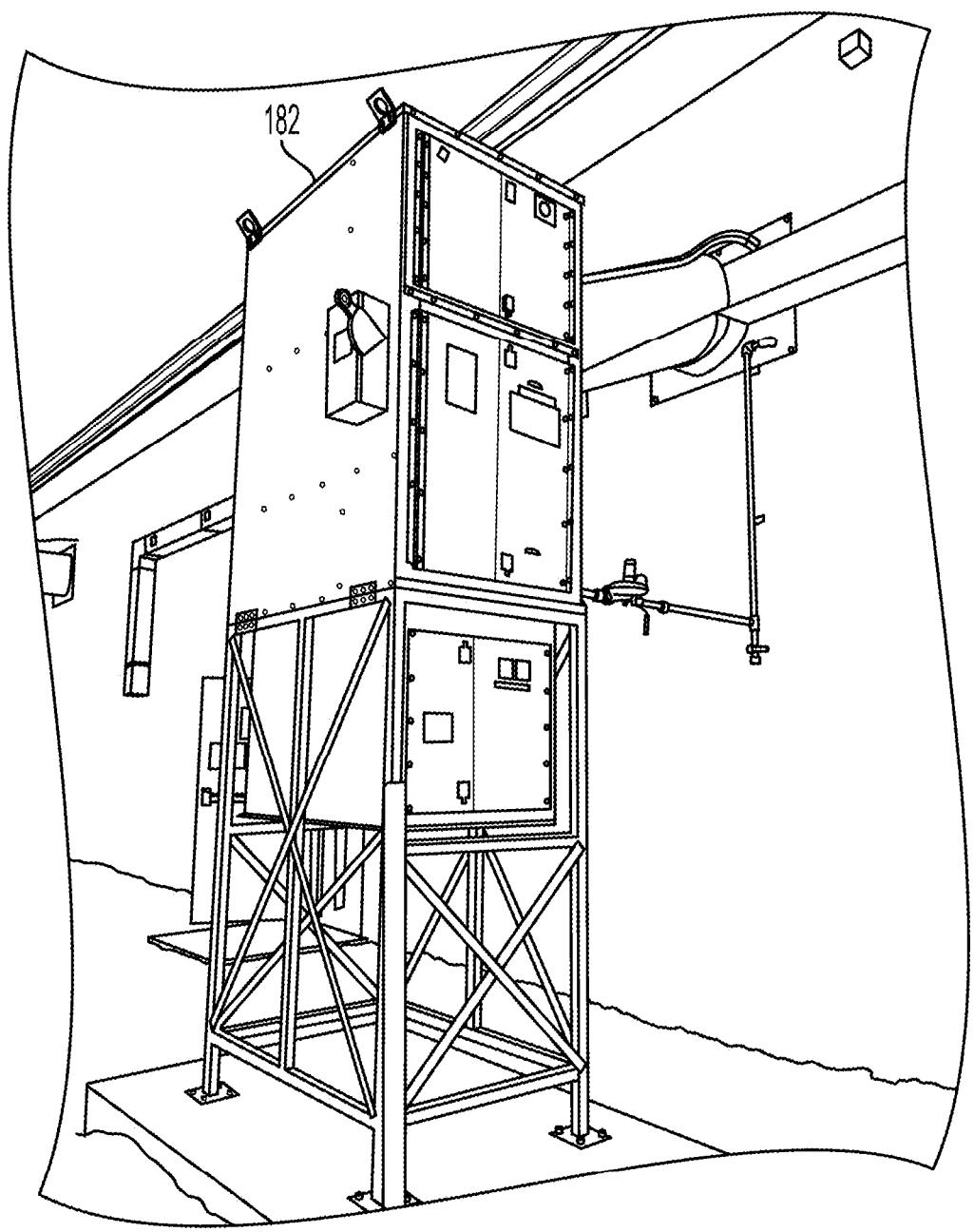
FIG. 29 is a perspective view of a portion of the air handing unit for preheating introduced ambient make up air.
Figure 30:
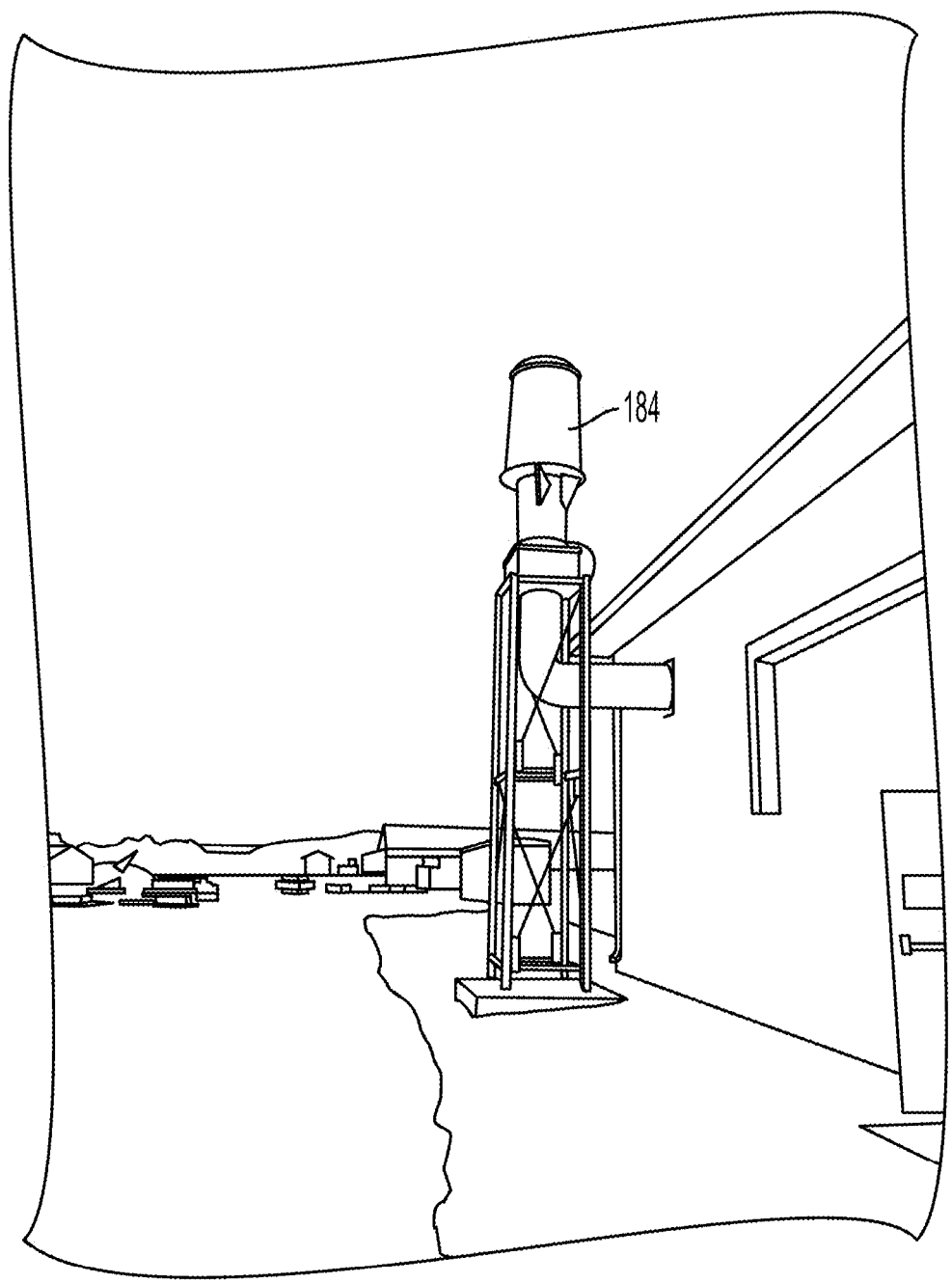
FIG. 30 is a perspective view of a filter in the air handing unit.
Figure 31:
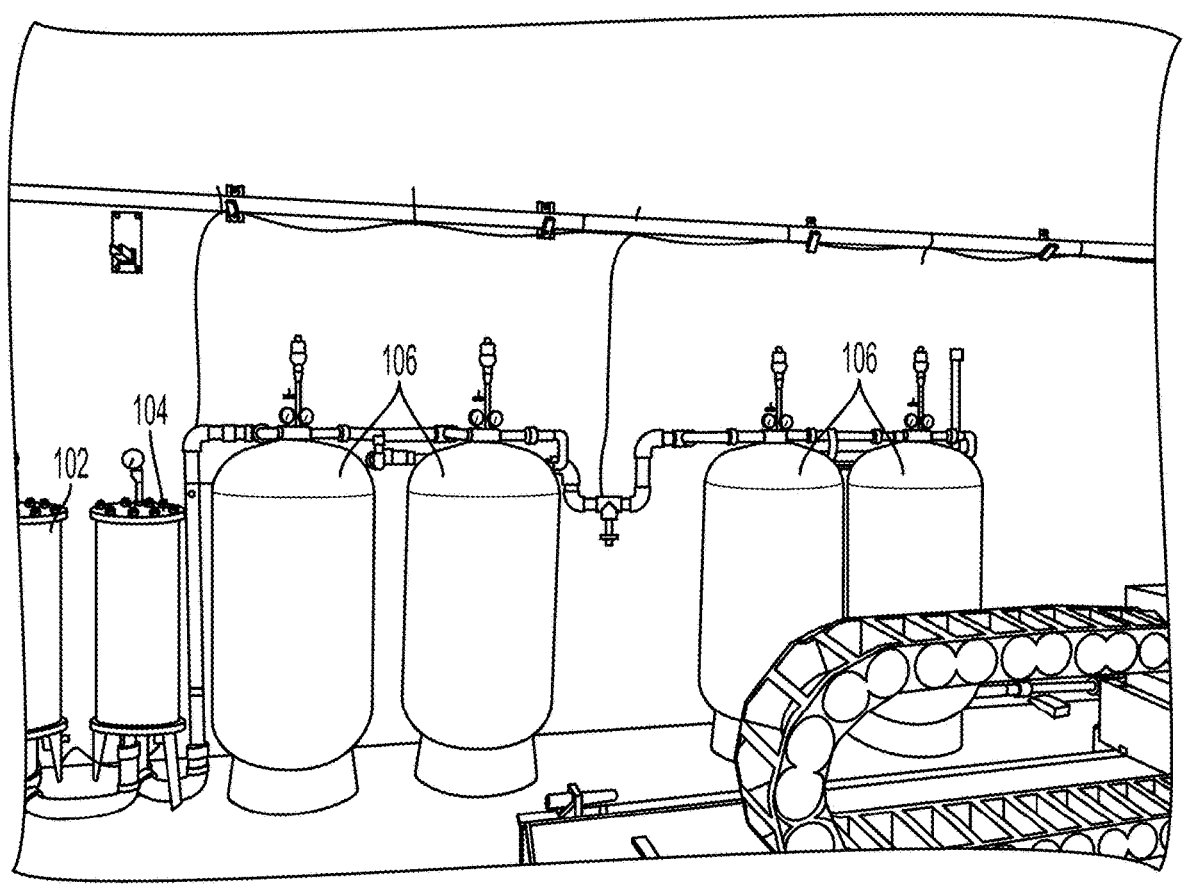
FIG. 31 is a side view of a portion of the water filtration downstream of the vacuum separator.
Figure 32:
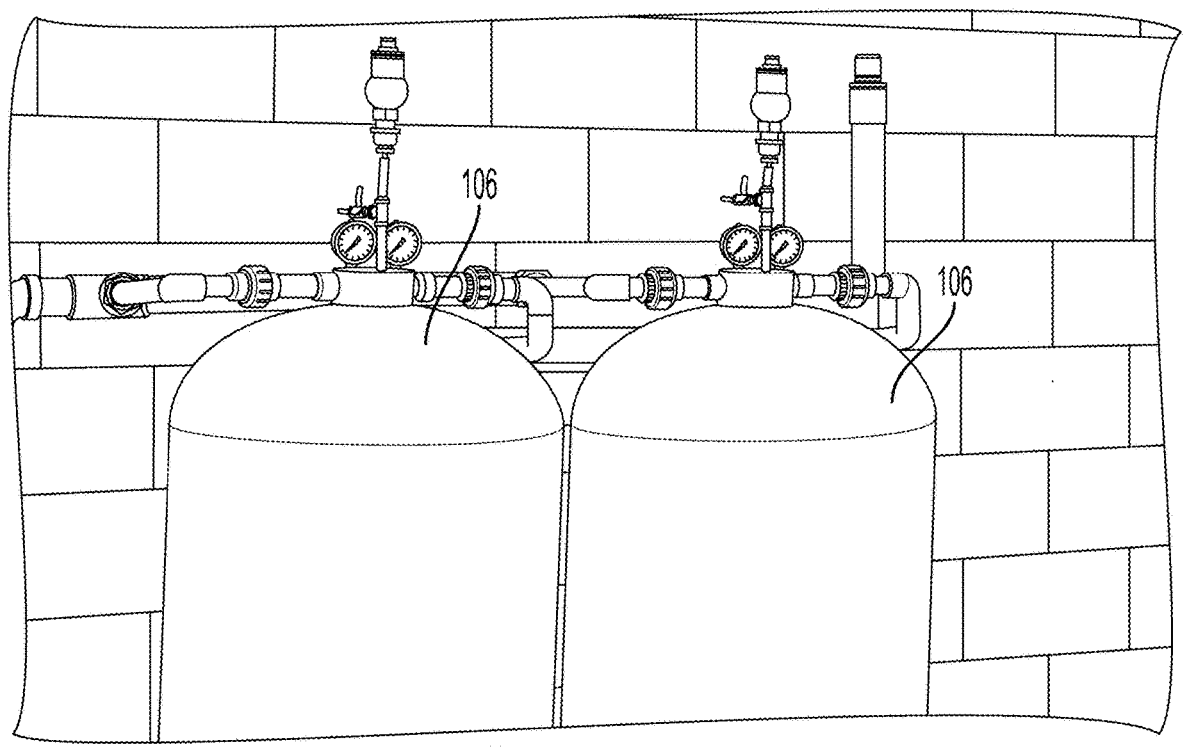
FIG. 32 is an enlarged view of a portion of FIG. 31 showing charcoal filter towers.
Figure 33:
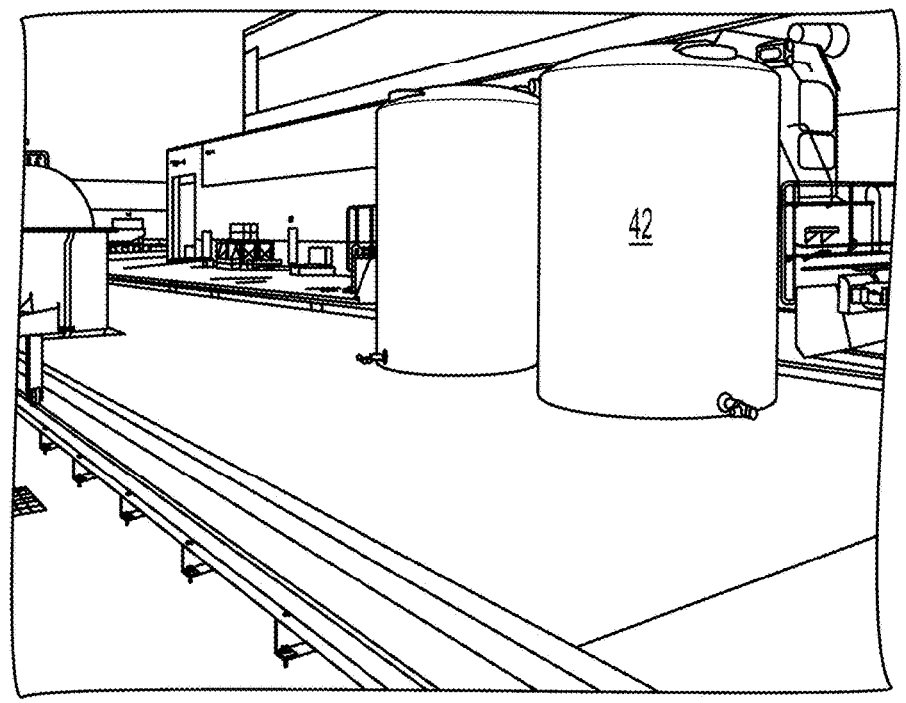
FIG. 33 is a perspective view of a pair of holding tanks for use in a closed loop system.
Figure 34:
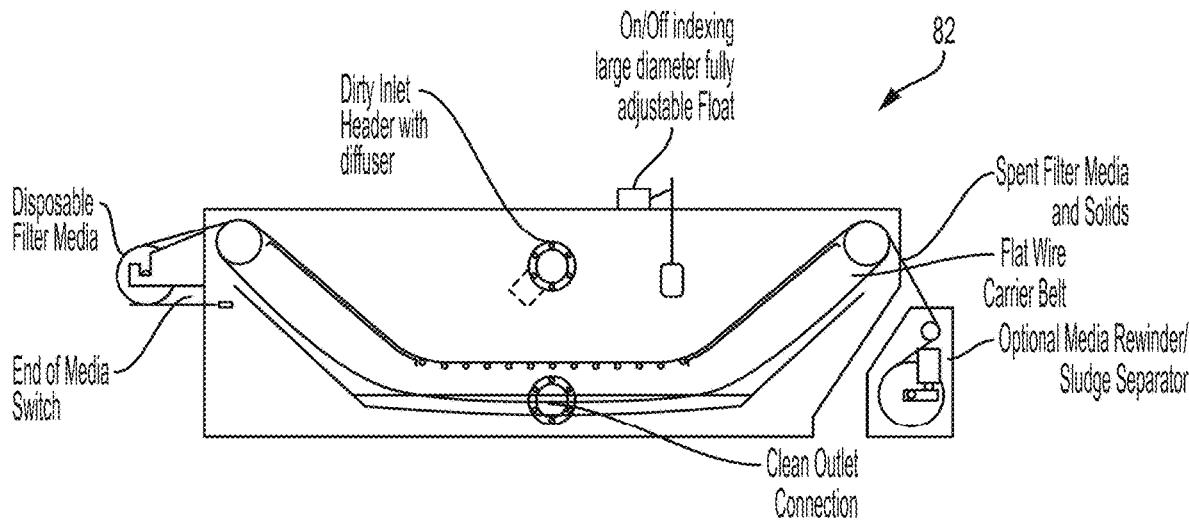
FIG. 34 is a schematic of a representative vacuum separator.
Figure 35:
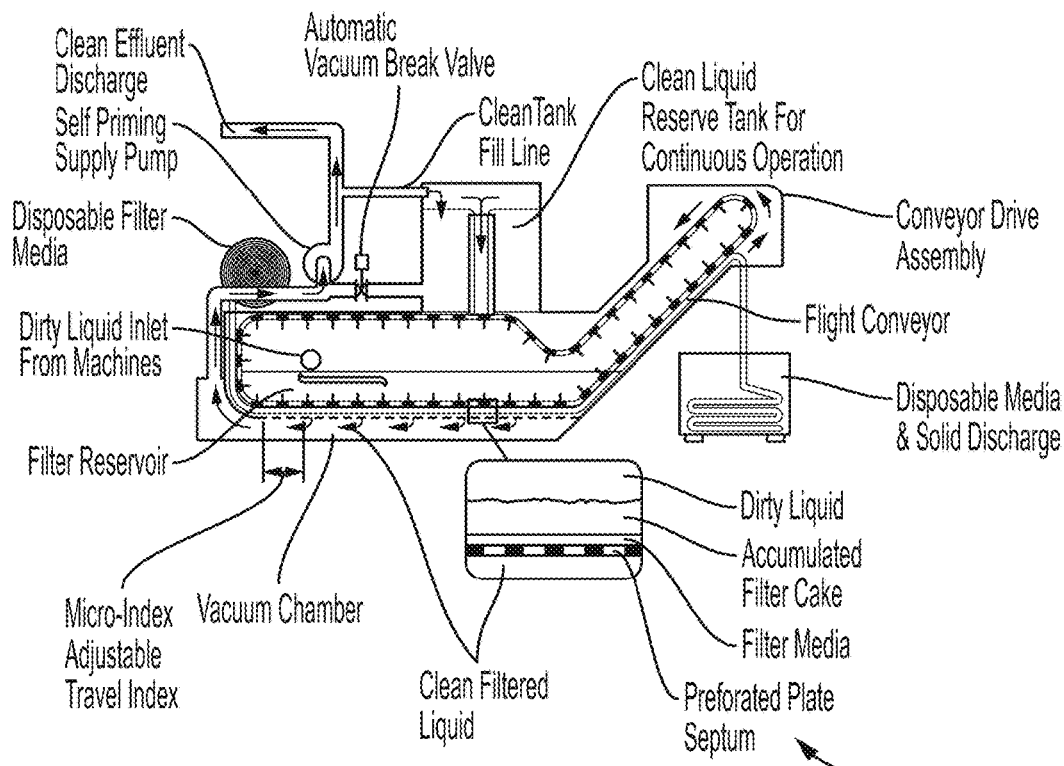
FIG. 35 is a schematic of an alternative representative vacuum separator.

Referring to FIG. 29, the system can provide for the preheating of introduced ambient make up air. That is, as the air filtration system maintains the enclosure at a negative pressure, make up air must be introduced to the enclosure 20. Thus, as seen in FIG. 29, the air handling unit 180 can preheat ambient air prior to introduction to the enclosure 22.

It is also contemplated that a preparation pad 32 can be located outside the enclosure 20 for preparing the excavated pipe sections 10 for processing. The preparation pad 32 includes a containment wall 34 and a drain 35 to the sump 160. The containment wall 34 is sufficiently high to retain any water used in the preparation of the pipe section 10. That is, in one application, the pipe sections 10 are presented for processing after having been transported overland, wherein the transportation required plastic wrapping and in select instances end caps. This shipping material must be removed from the pipe section 10 prior to processing, but as some coating may by knocked off during removal of the wrapping (shipping material), the preparation of the pipe section often requires clean up. The preparation pad 32 has a sufficient foot print to allow for preparation (unwrapping) of the pipe section 10 such that any dislodged coating material will be within the containment wall 34. As the drain 35 is fluidly connected to the sump 160, dislodged material from the preparation pad can be washed to the sump for separation and preparation for proper disposal.

Figure 4:
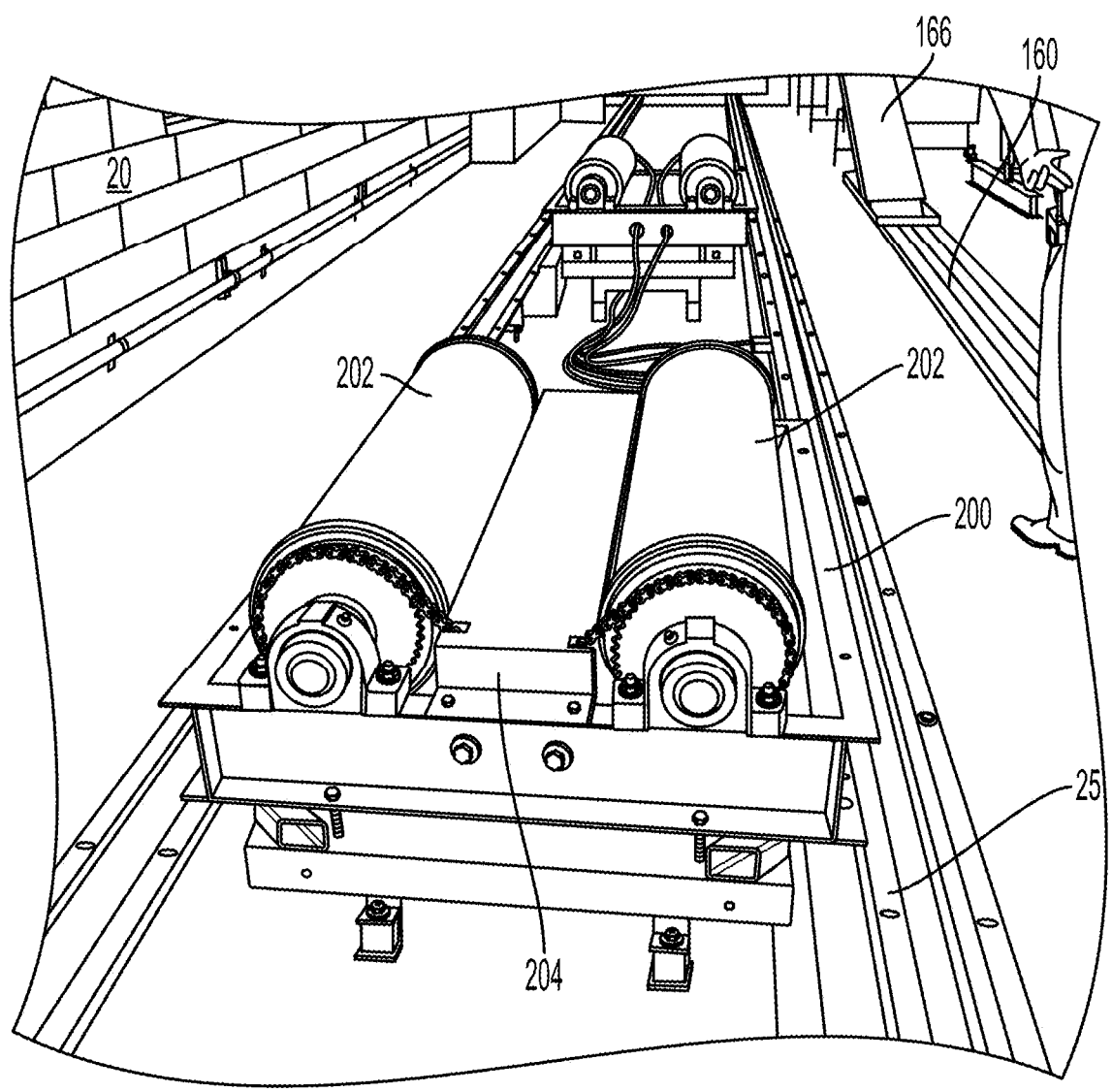
FIG. 4 is a perspective view of a pair of support stands.
Figure 5:
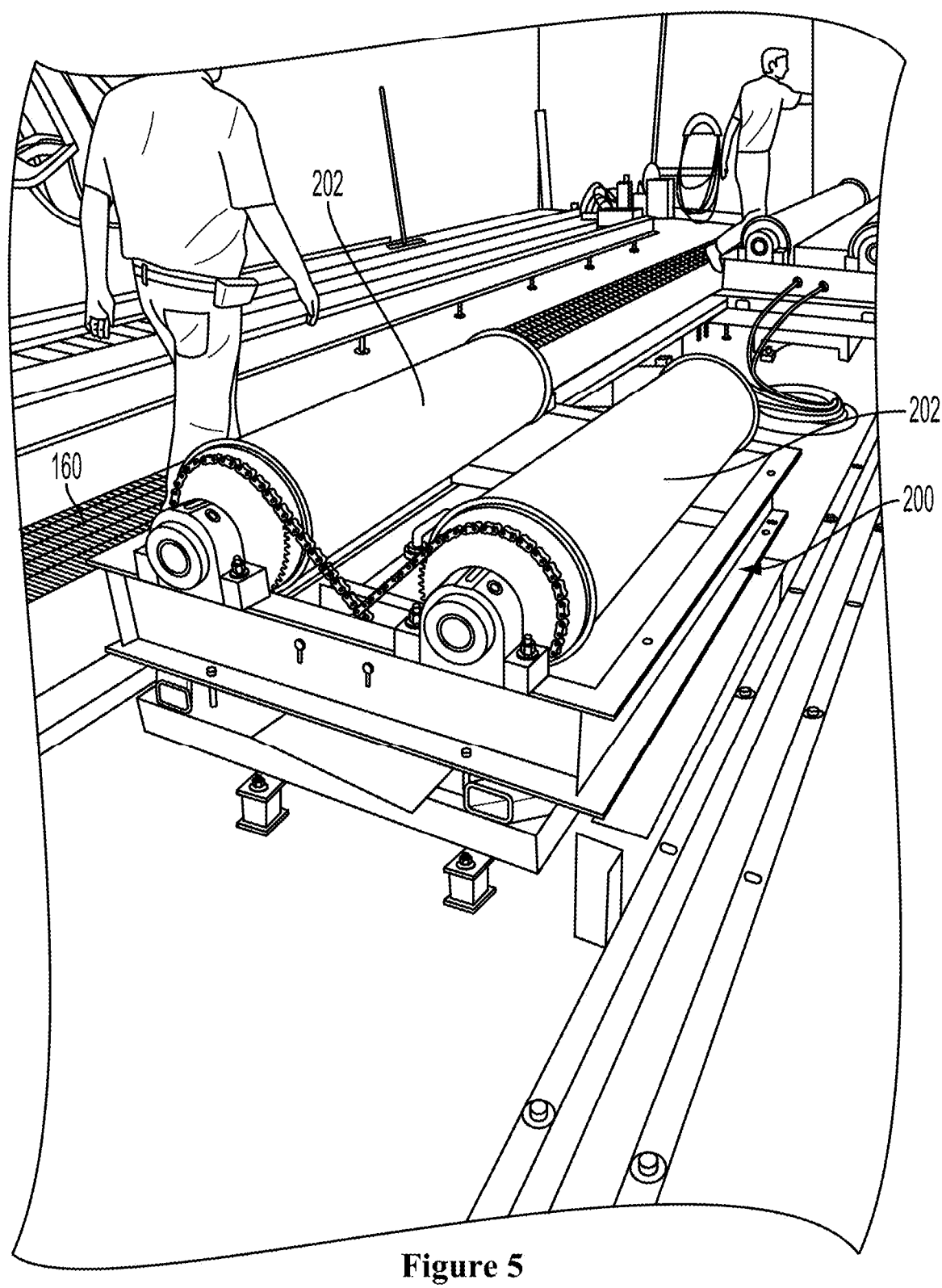
FIG. 5 is a perspective view of a one of the support stands.
Figure 6:
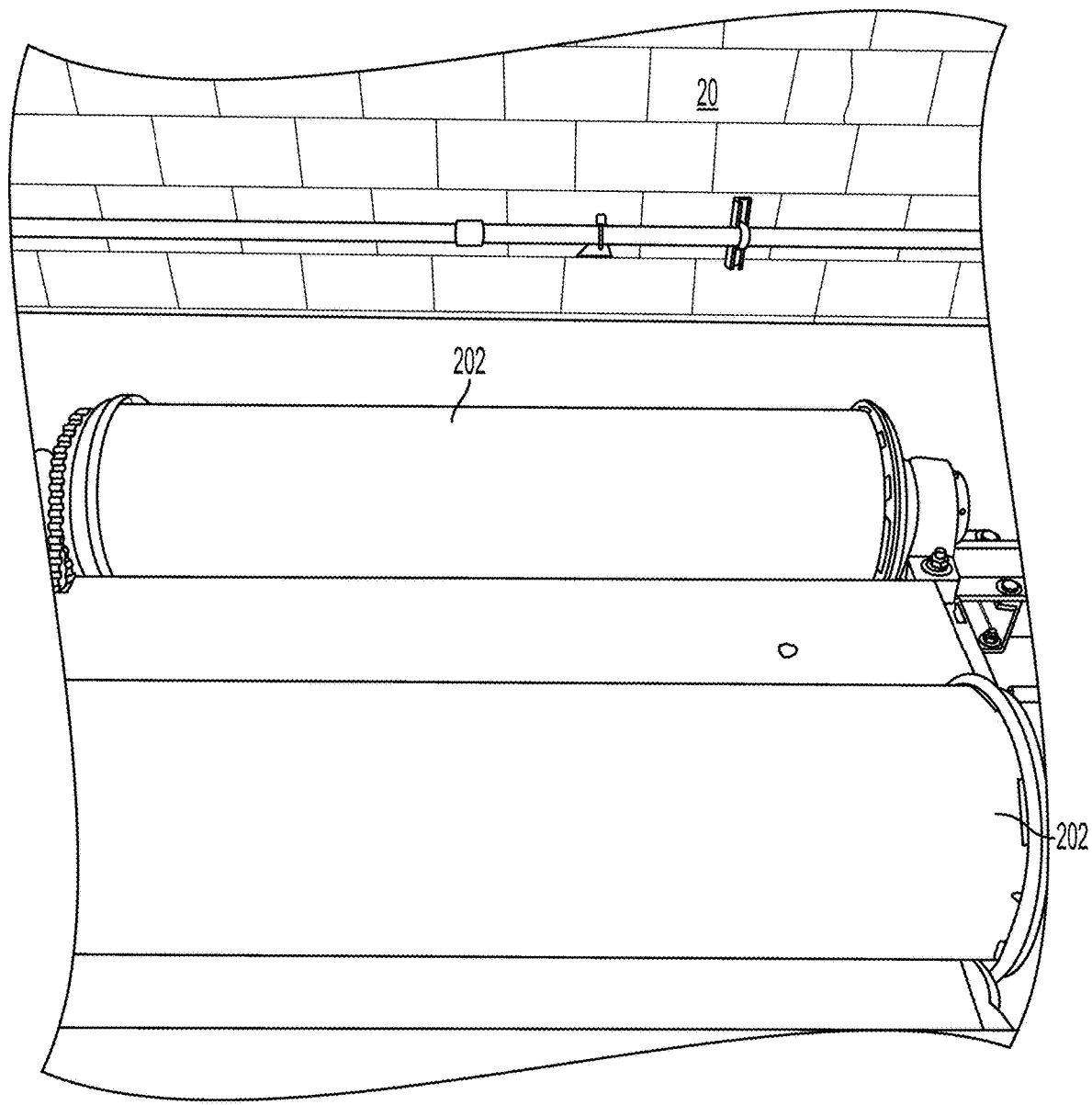
FIG. 6 is a side view of a one of the support stands.
Figure 7:
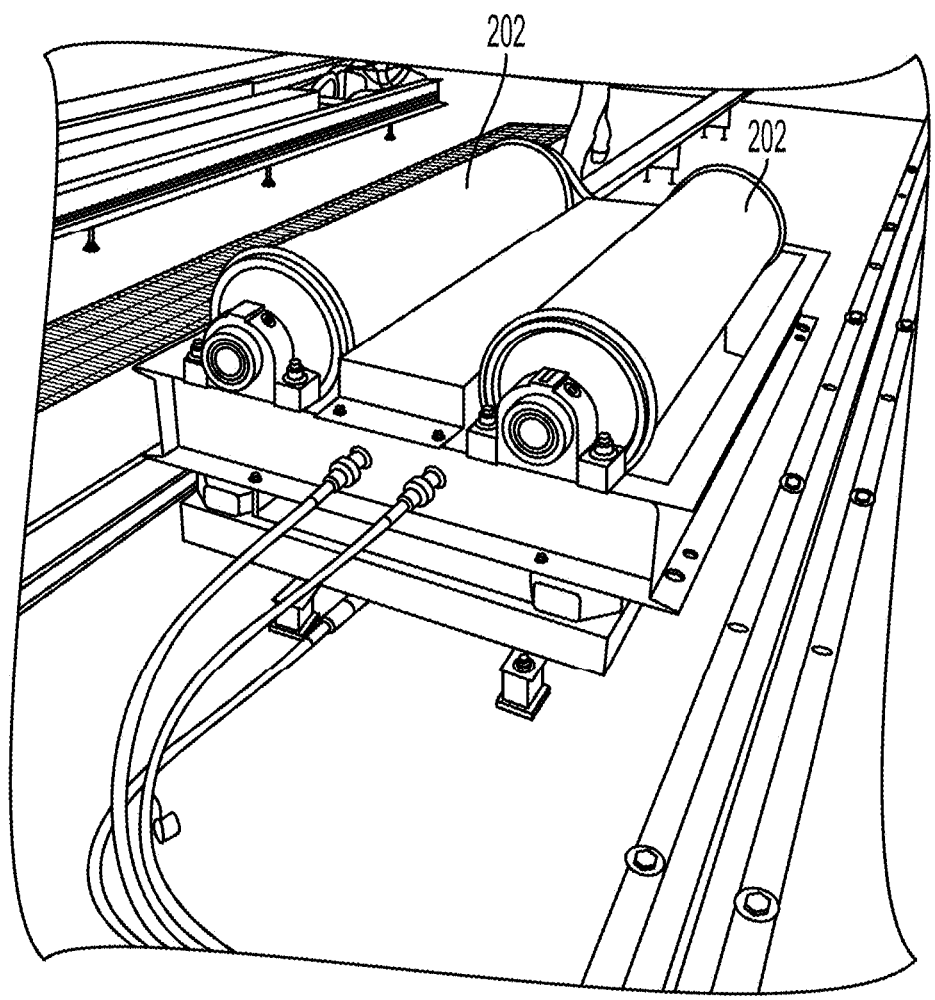
FIG. 7 is an enlarged end view of a one of the support stands.
Figure 8:
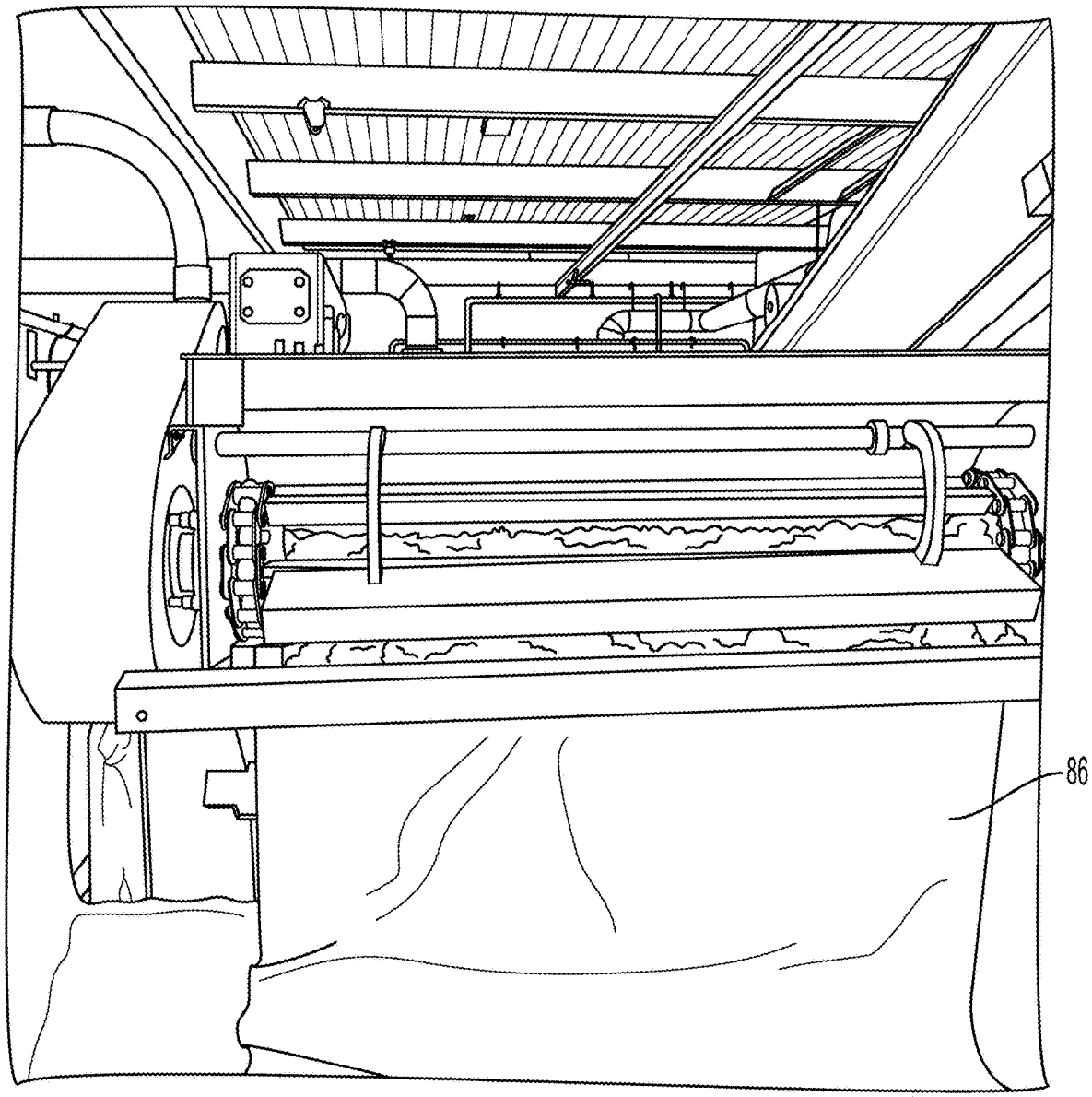
FIG. 8 is an end view of the disposable filter media having passed through a vacuum filter.
Figure 9:
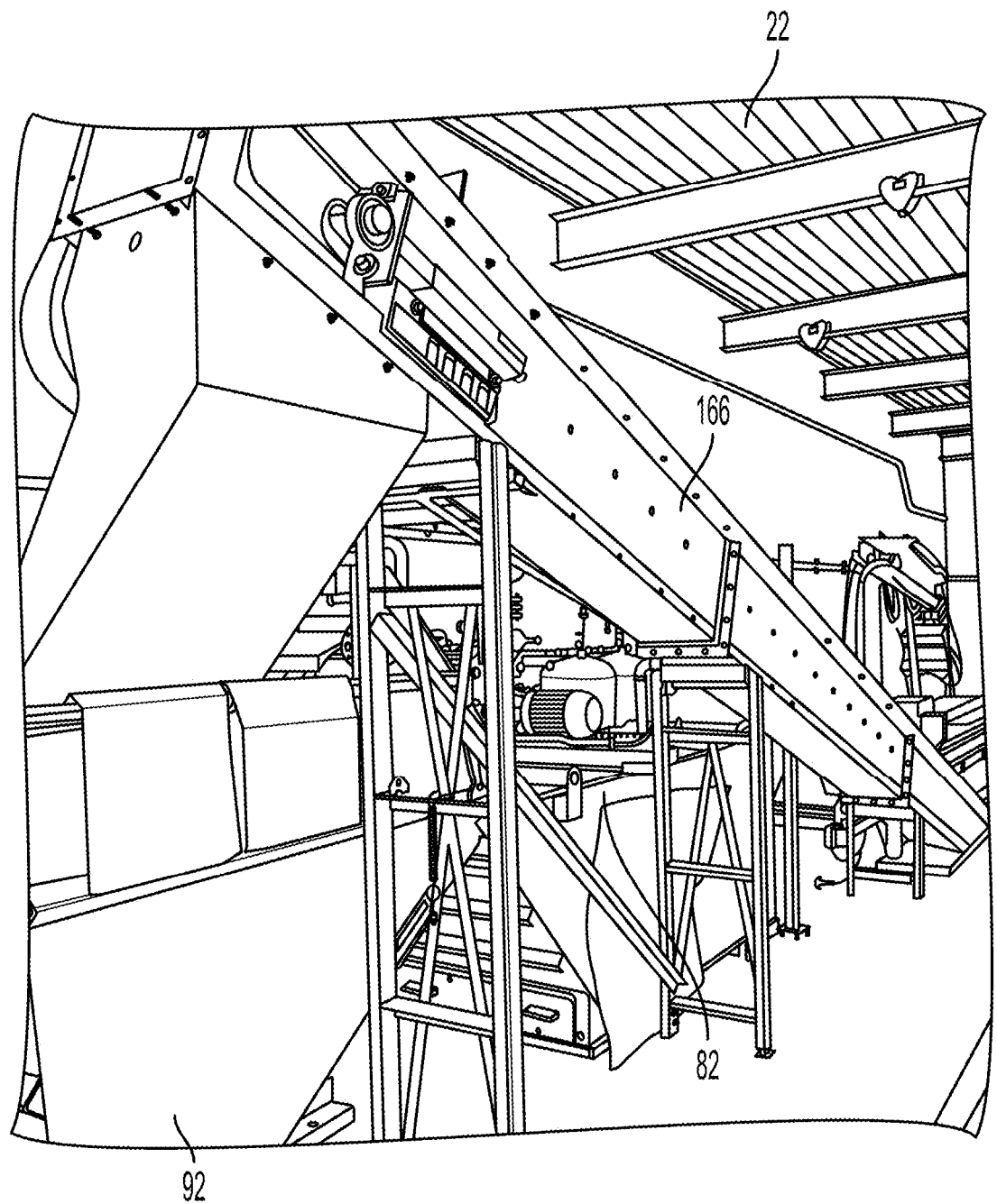
FIG. 9 is an end perspective view of a conveyor and vacuum filter passing debris to a disposal bin.
Figure 10:
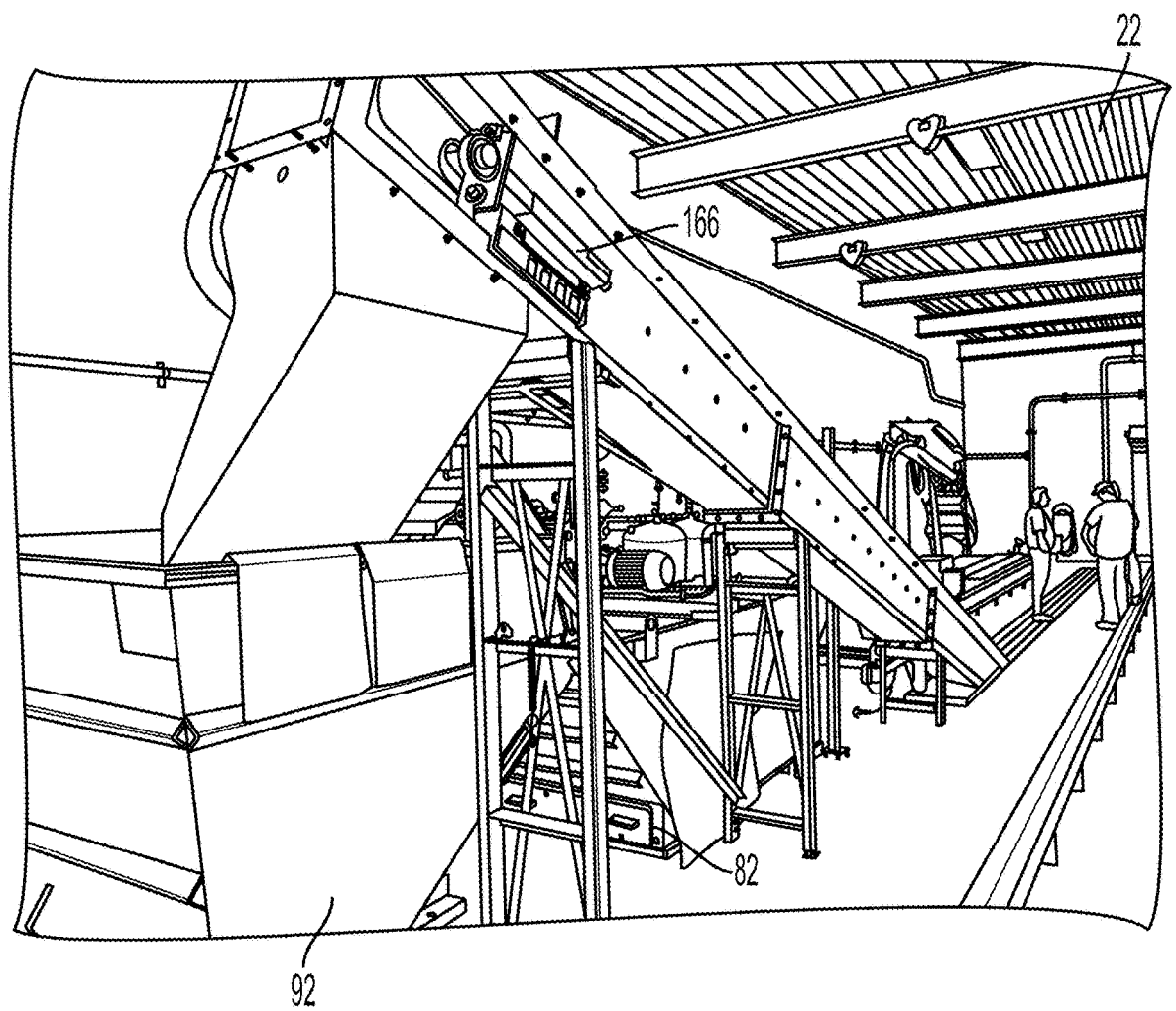
FIG. 10 is a further end perspective view of a conveyor and vacuum filter passing debris to a disposal bin.
Figure 11:
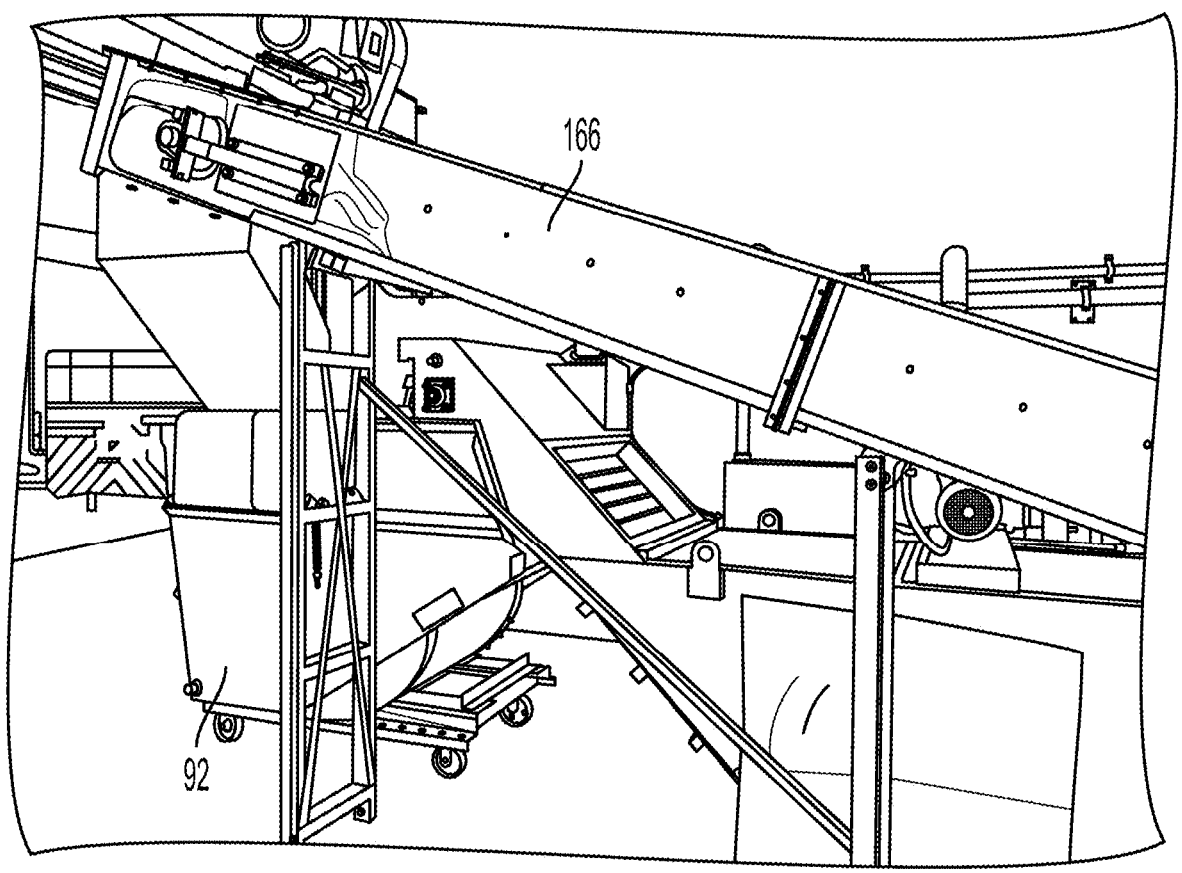
FIG. 11 is a side view of a conveyor and vacuum filter passing debris to a disposal bin.
Figure 12:
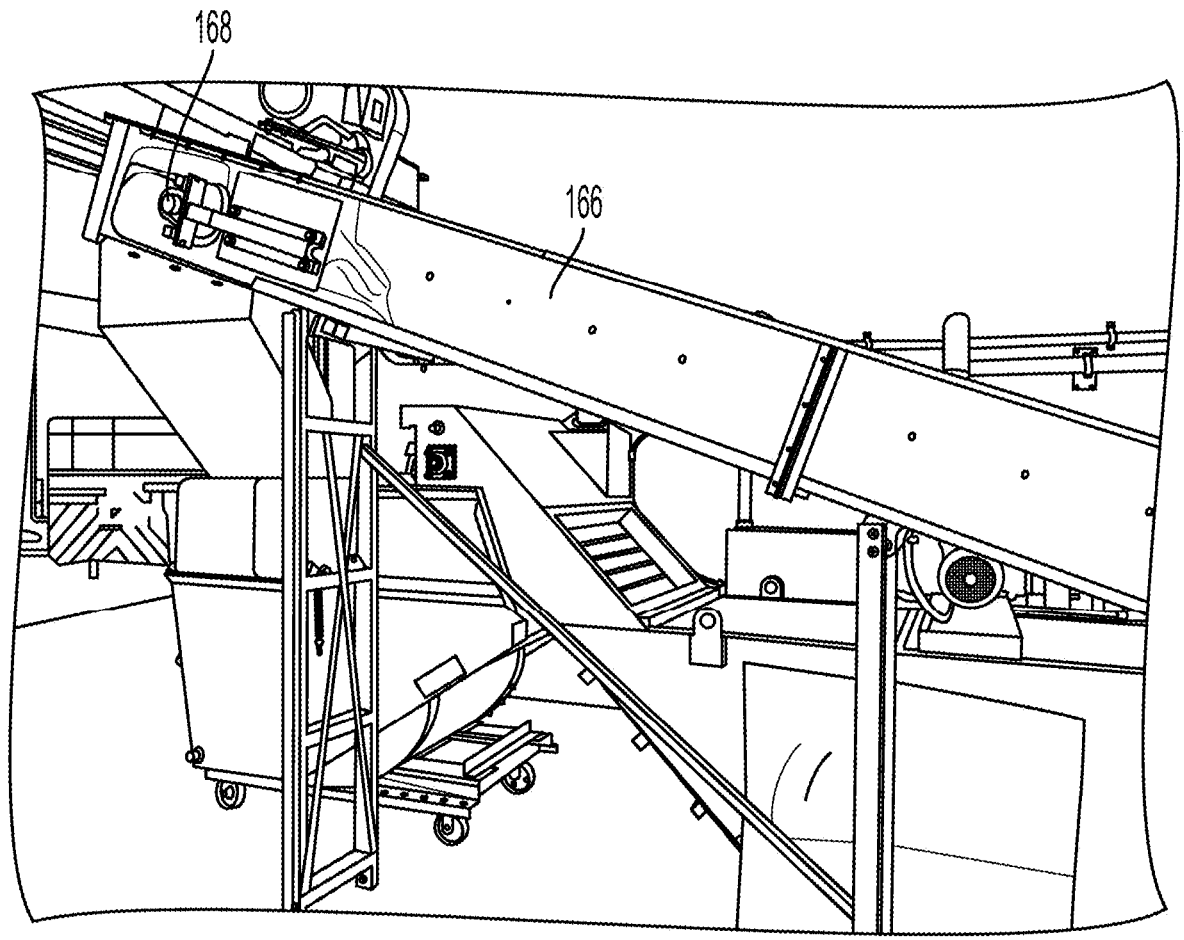
FIG. 12 is another side view of a conveyor and vacuum filter passing debris to a disposal bin.
Figure 13:
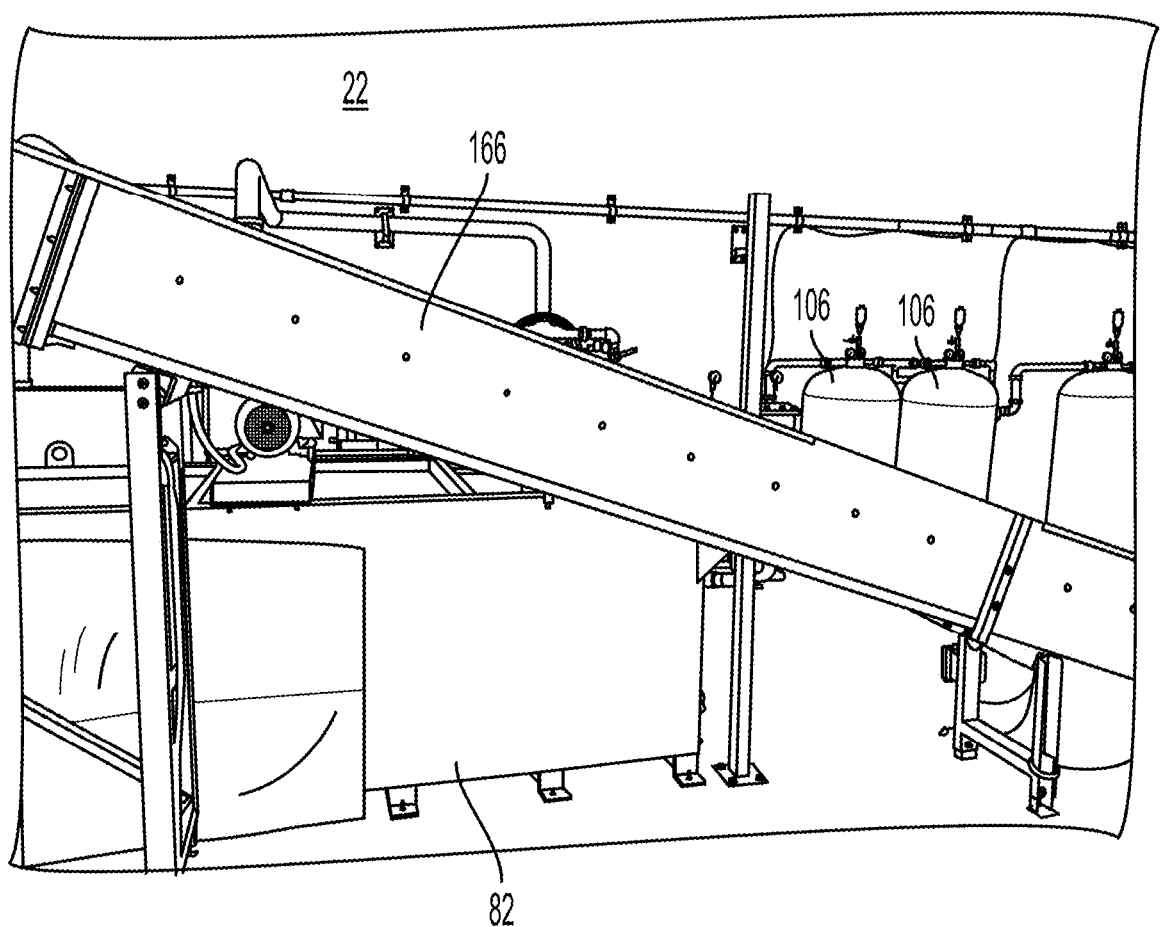
FIG. 13 is side view of a portion of conveyor and vacuum filter passing debris to a disposal bin.
Figure 14:
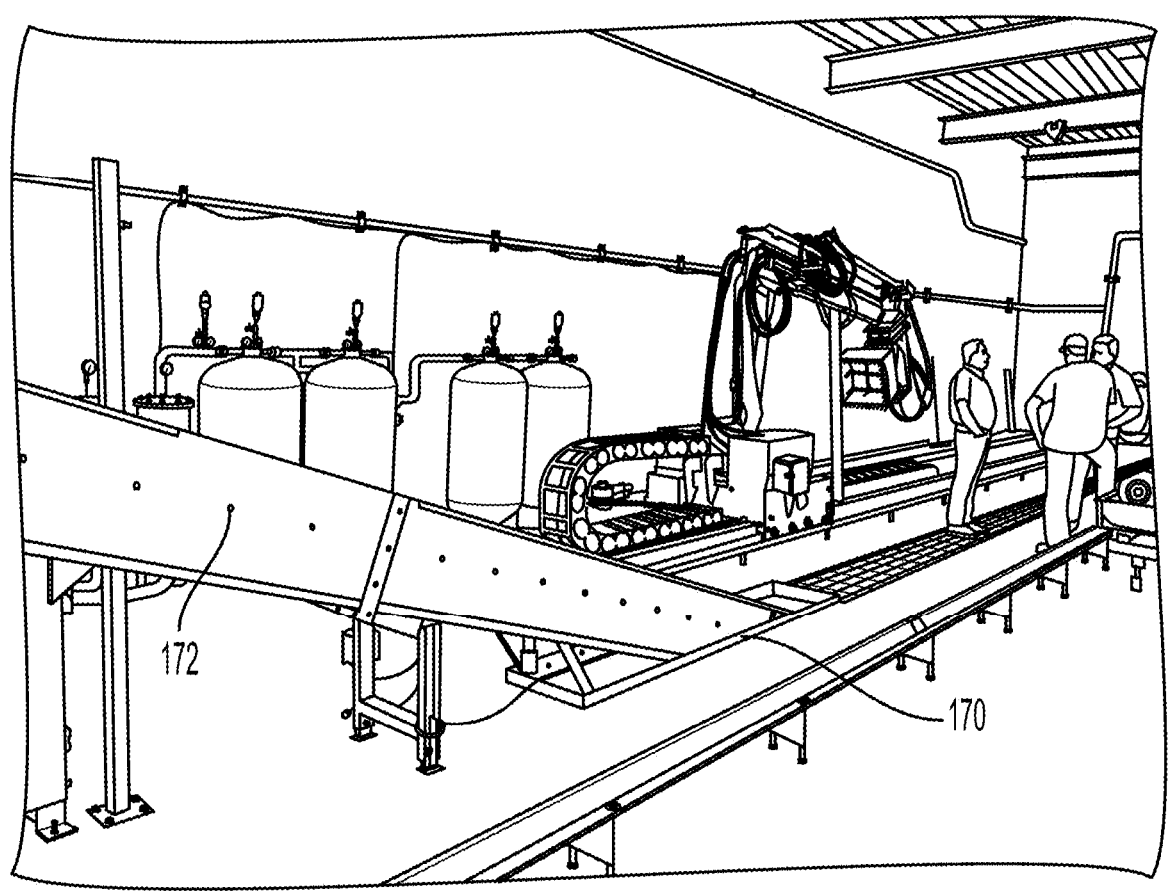
FIG. 14 is side view of a portion of conveyor extending from a sump.
Figure 15:
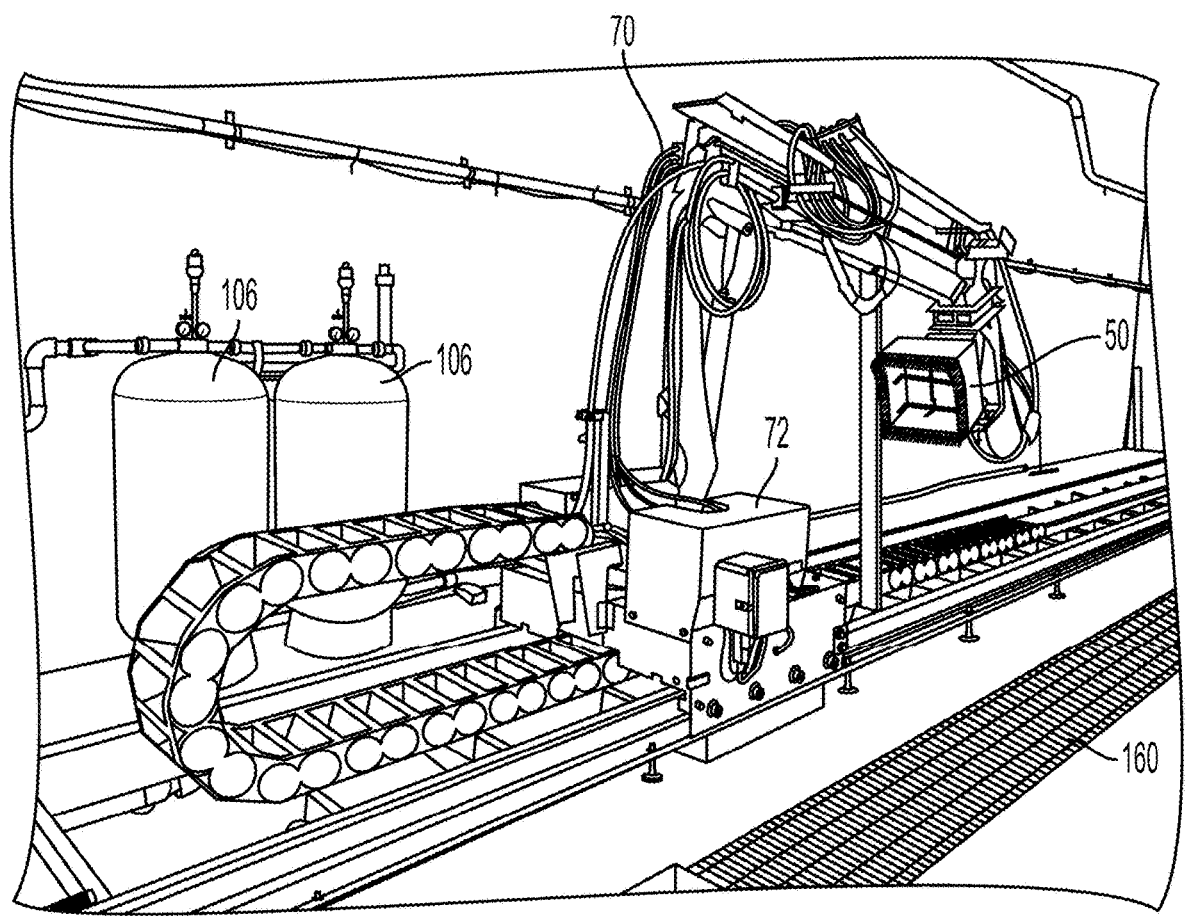
FIG. 15 is perspective view of a spray head, a nozzle box and robotic arm adjacent to the sump.
Figure 16:
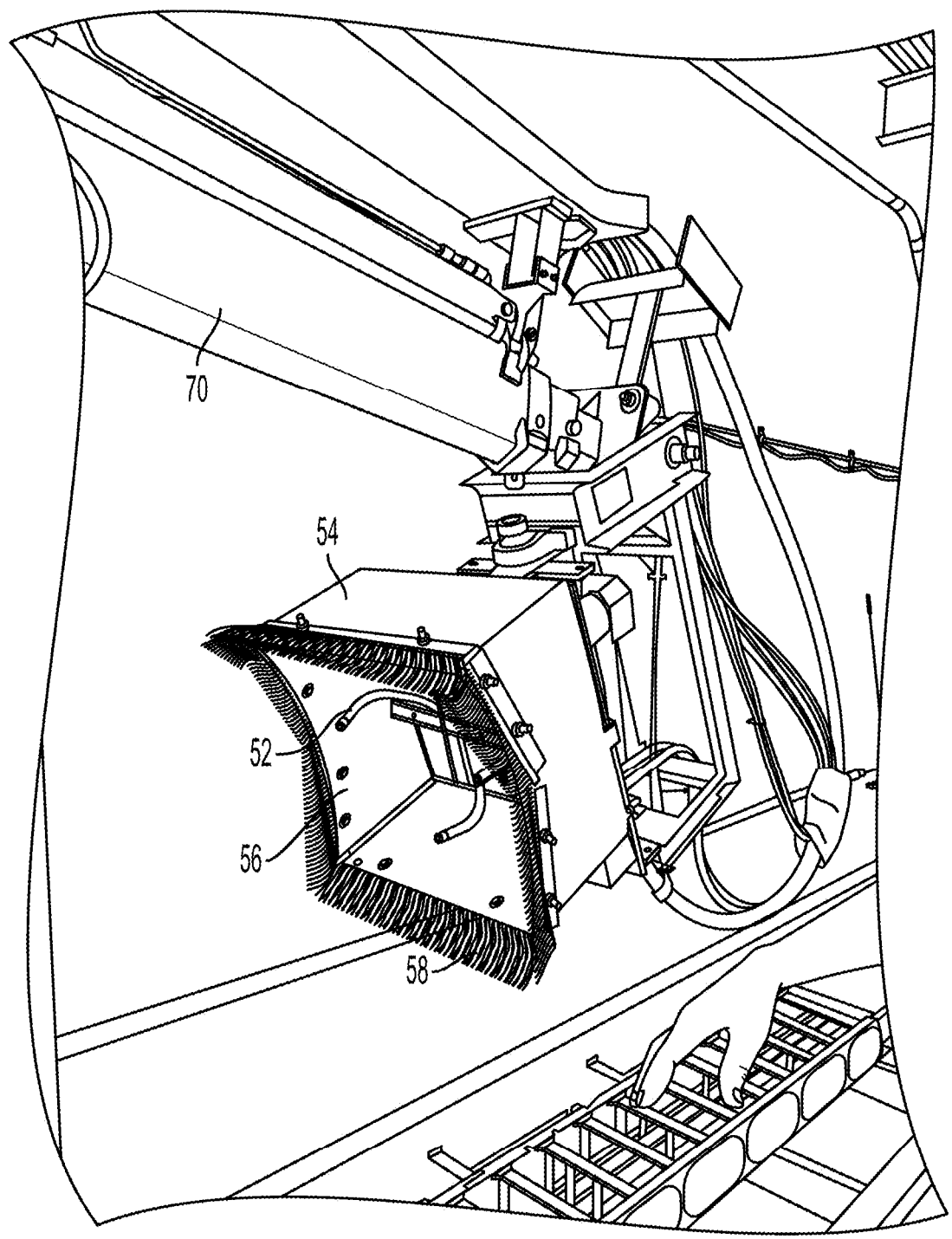
FIG. 16 is perspective view of the spray head and nozzle box at the end of the robotic arm.
Figure 17:
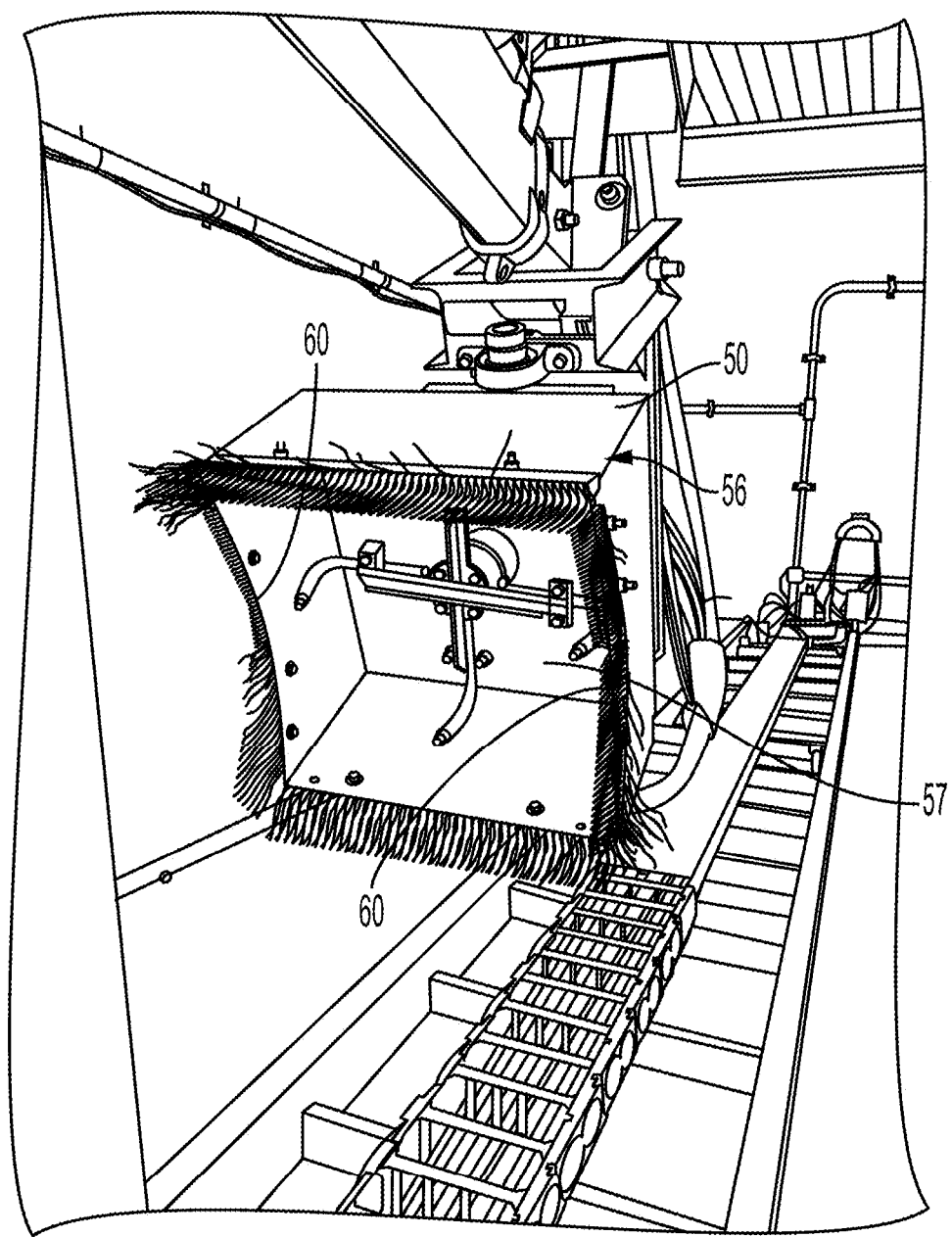
FIG. 17 is another perspective view of the spray head and nozzle box at the end of the robotic arm.
Figure 18:
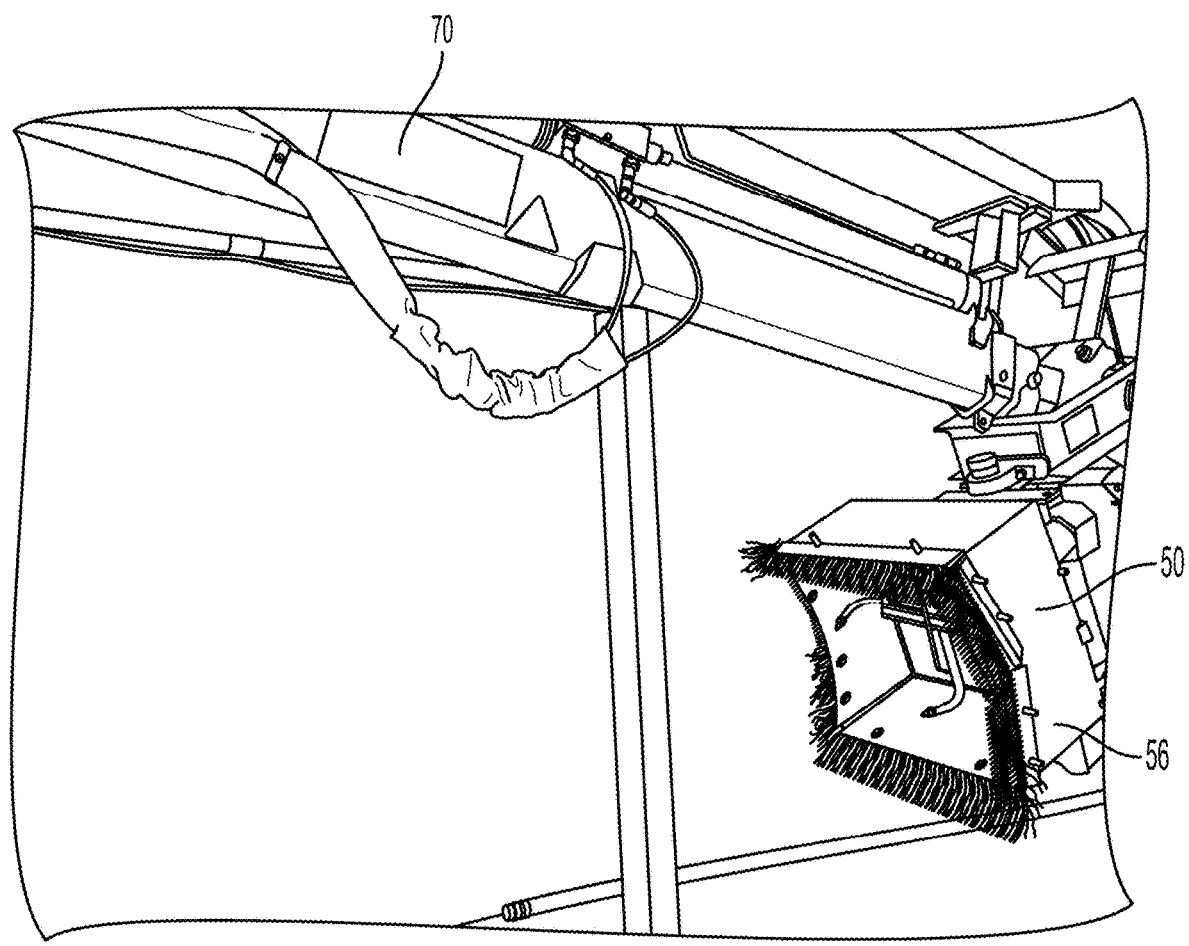
FIG. 18 is a further perspective view of the spray head and nozzle box at the end of the robotic arm.
Figure 19:
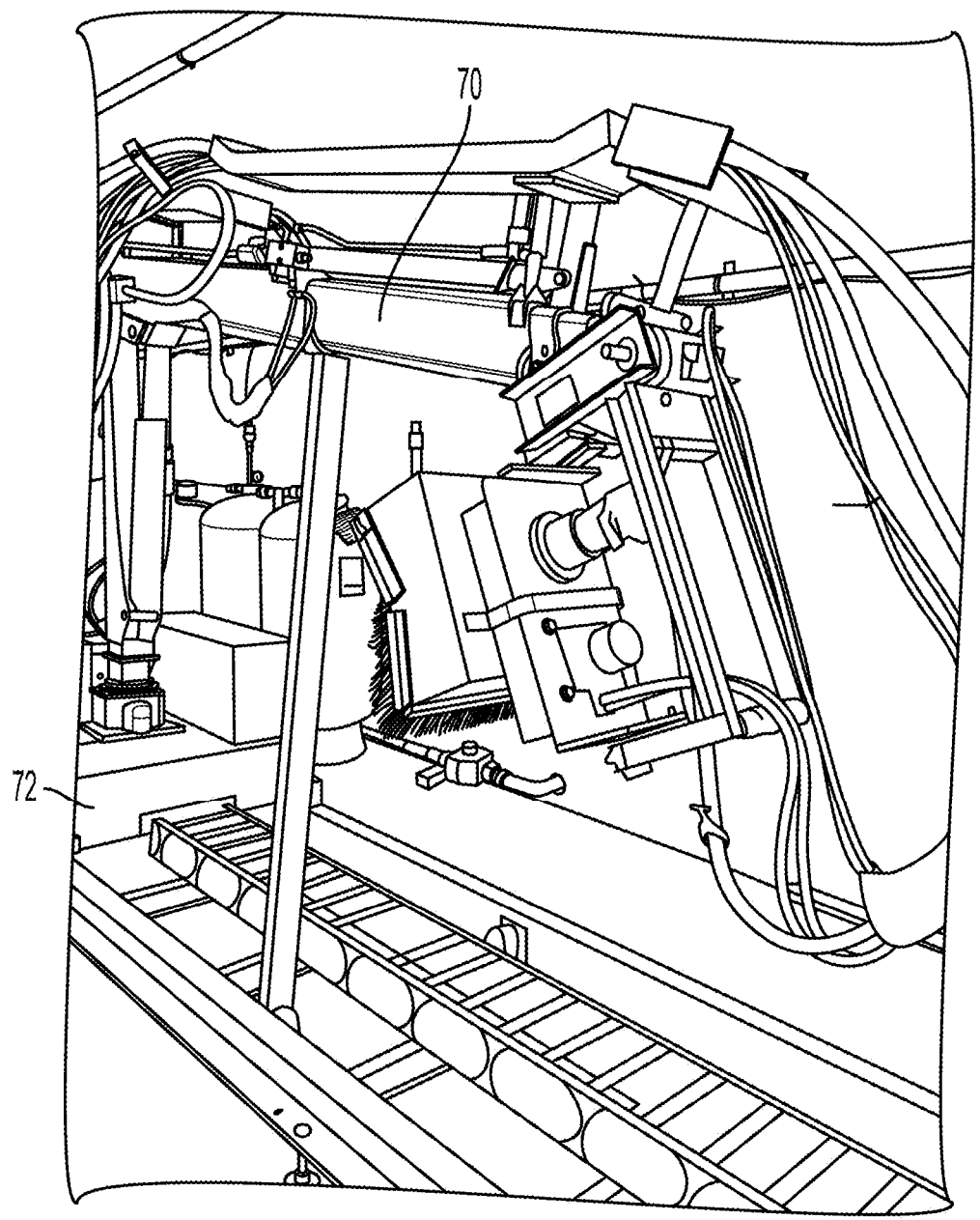
FIG. 19 is a perspective view of the spray head and nozzle box at the end of the robotic arm.
Figure 20:
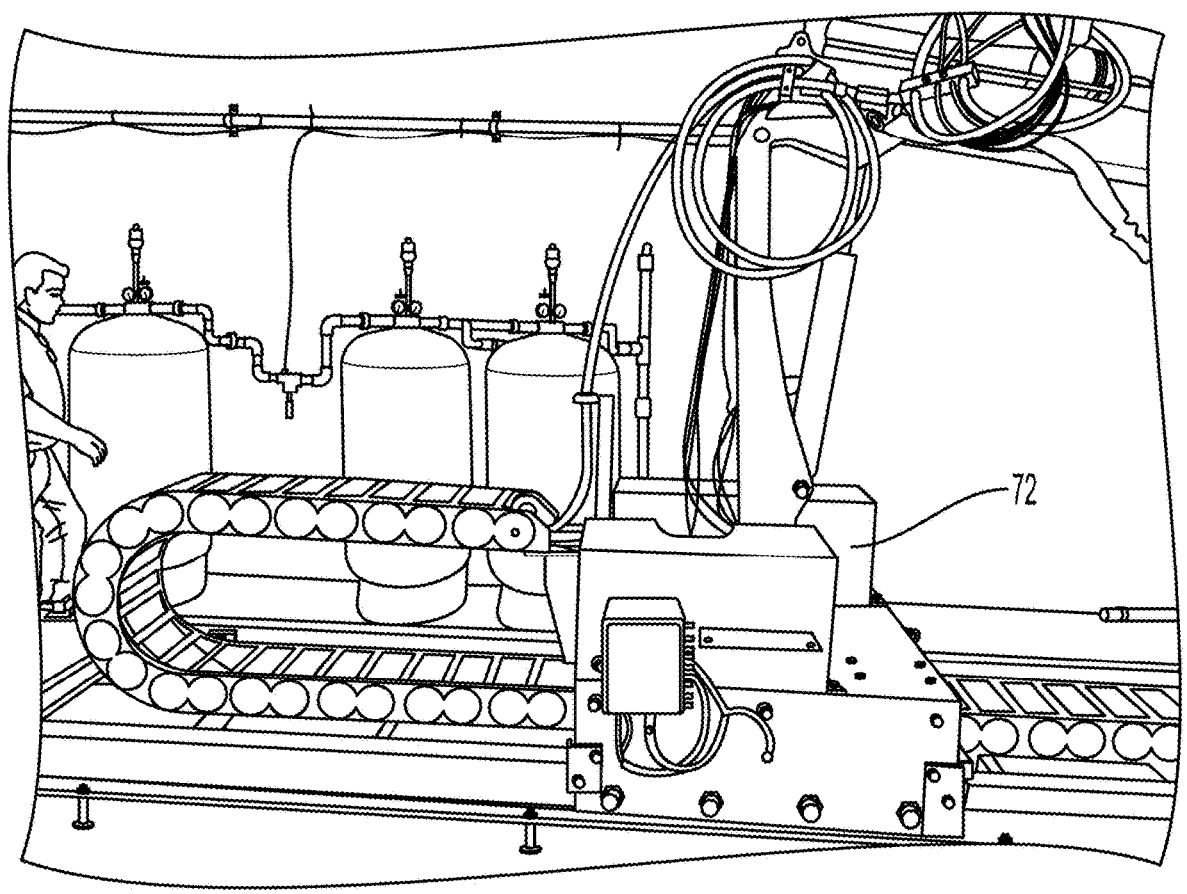
FIG. 20 is a side view of a base of the robotic arm.
Figure 21:
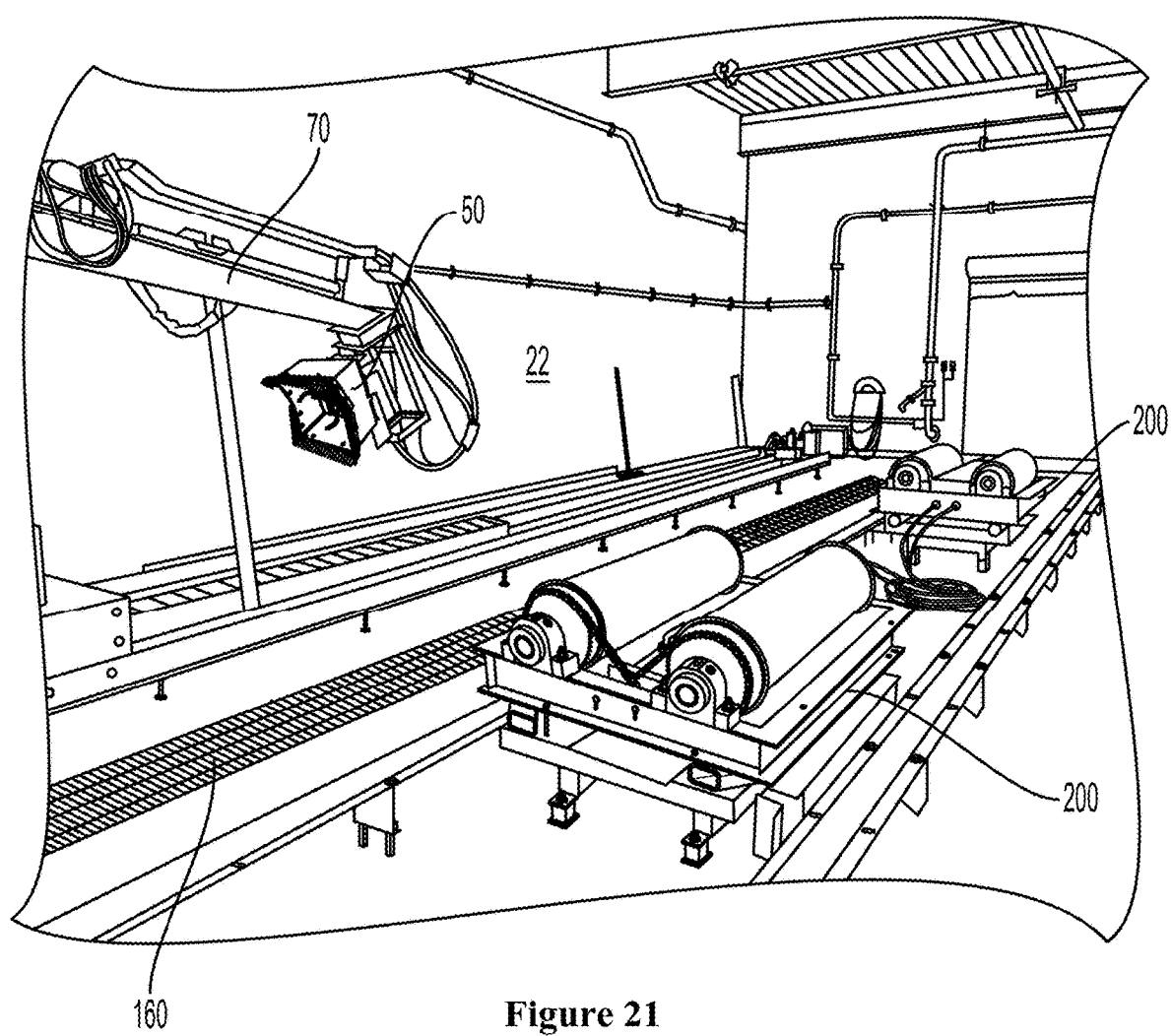
FIG. 21 is a perspective view of the spray head and nozzle box at the end of the robotic arm relative to the sump and the support stands.
Figure 22:
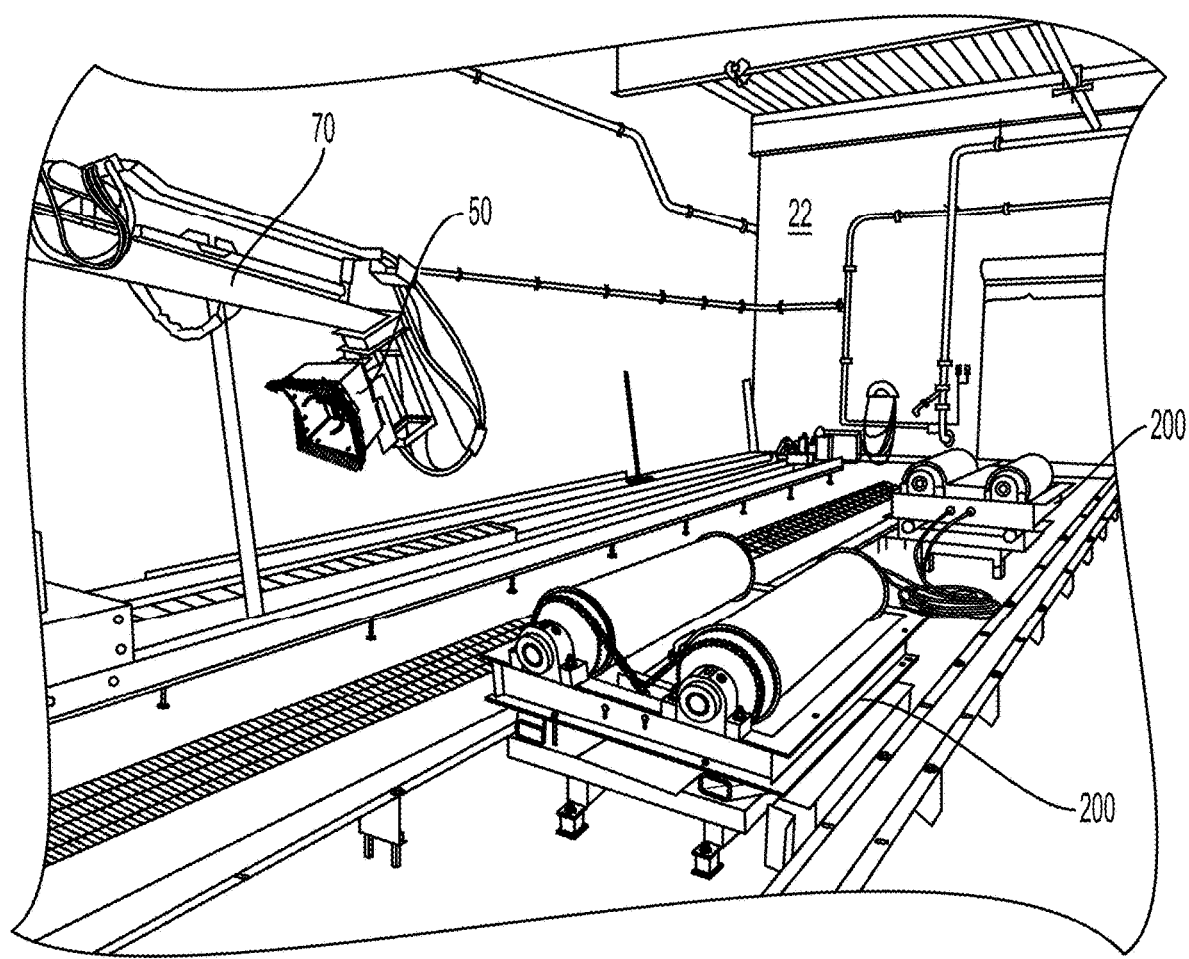
FIG. 22 is a perspective view of the spray head and nozzle box at the end of the robotic arm relative to the sump and the support stands.
Figure 23:
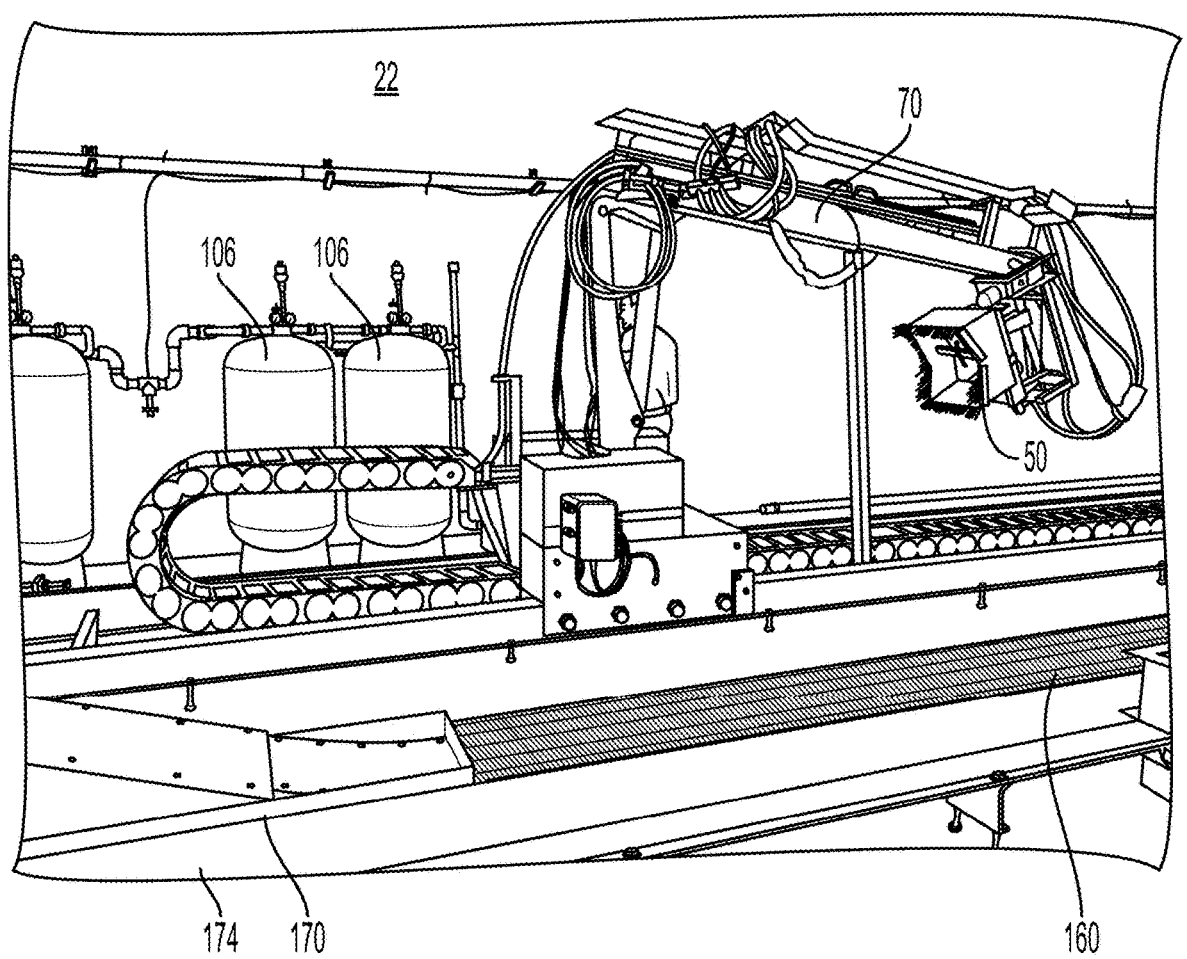
FIG. 23 is a perspective view of the spray head and nozzle box at the end of the robotic arm relative to the sump and the conveyor extending from the sump.

The system includes at least one and typically two support stands 200 for supporting the pipe section 10 being treated. As seen in FIGS. 4-6, the support stand 200 includes a pair of parallel rollers 202 extending parallel to the longitudinal axis of the pipe section 10, wherein a nip 203 between the rollers contacts the exterior surface of the pipe section. In one configuration, as seen in FIGS. 5 and 6, the rollers include spaced flanges for defining the contact with the pipe section 10. The flanges define a reduced contact area with the pipe section 10, thereby assisting in ensuring intended rotation of the pipe section. That is, the increased pressure by reducing the contact area improves rotation of the pipe section corresponding to rotation of the roller 202. In one configuration, the flanges can be formed of a length rebar welded to the roller so as to define the contact surface with the pipe section 10. The rebar can have a diameter from approximately ⅛ inch to 2.25 inches. The flanges can be in a plane transverse to the longitudinal axis of the pipe section or can be inclined (typically from each end of the roller) so as to tend to center the pipe section on the roller.

By selectively rotating at least one of the rollers 202 (wherein a remaining roller can be an idler), the pipe section 10 can be rotated about its longitudinal axis. The necessary motive force for imparting rotation of the at least one roller 202 can be implemented by hydraulic or electric motors 204 connected to the roller, wherein application of the motive force can be remotely controlled. The support stands 200 can include a bogie or railroad truck configured to operably engage the rails 25, can be independently wheeled or can be fixed (so are to receive the pipe section of rail car).

The high-pressure spray system 40 provides for the pressurization and impact of the high pressure jets with the exterior of the pipe section 10.

The high-pressure spray system 40 includes a reservoir 42, such as for retaining a volume of water, at least one pump 44 and a motor 46 for generating the necessary pressure and flow rate, high pressure piping 48 and a spray head 50 having nozzles 52 for forming high pressure jets for impacting the exterior of the pipe section 10 to remove the coating. Generally, the high-pressure spray system 40 is configured to provide at least 20,000 psi (pounds per square inch) pressure. It has been found a 200 HP motor 46 can provide a flow rate of 18 gallons per minute (gpm) for supplying a four nozzle 52 spray head 50 having 2 nozzles spaced between approximately 4 and 36 inches apart. It is further contemplated the spray head 50 can be rotatable, such as a spinning head.

In one configuration, the spray head 50 is partly located within a nozzle box 54, which is connected to a robotic arm 70 for moving relative to the pipe section 10 retained on the support stands 200. The robotic arm 70 is connected to the controller 140 to be remotely controllable so that the operator is located outside of the negative pressure enclosure 20, volume, or bay 26. In one configuration, the robotic arm 70 is carried by a carriage 72 that moves along the longitudinal axis of the pipe section 10, wherein the robotic arm can move the spray head 50 about 1 to 6 axes to operably locate the spray head relative to the exterior surface of the pipe section. The movement of the robotic arm 70 can be imparted and controlled as known in the art by hydraulic or electromechanical power. In particular, the control of the robotic arm 70 can be remotely accomplished by a wired or wireless transmission to a location outside of the bay 26 (or enclosure 20).

Referring to FIGS. 14-19, the nozzle box 54 can include a rigid shroud 56 which defines an open faced box retaining the spray head 50. In one version, the shroud 56 includes a back wall 57 and a skirt 58 that extends from the back wall, wherein the spray head 50 is recessed from a free edge 58a of the skirt. As seen in the Figures, two opposing walls 60, 62 in the skirt 58 have an arcuate free edge 60a, 62a respectively generally conforming to the radius (circumference) of the pipe section 10. This allows relatively adjacent positioning of the nozzle box spray head 50 to the external surface of the pipe section 10.

The nozzle box 54 further includes a flexible curtain 64 about the periphery of the skirt. The curtain 64 can be formed by a variety of materials, such as a multitude of bristles 65. The bristles 65 are sized and selected to contact the exterior surface of the pipe section 10 while the spray head 50 remains spaced from the exterior surface of the pipe section, such as by 1-6 inches. The bristle curtain is selected reduce the transmission of reflected spray from within the nozzle box 54, while accommodating variations of the pipe section dimensions along the longitudinal axis.

The sump 160 is located beneath (at a lower elevation than) the pipe section 10 being treated. The sump 160 can be directly beneath the pipe section being treated or may be horizontally and vertically displaced from the pipe section 10. The sump 160 can extend along the entire length of the pipe section 10 or just the portion of the pipe section that is being impacted with the jets. It is understood the sump 160 can have a constant depth along its length or can have a given length of maximum depth, wherein sloping shoulders 162 direct spray and entrained solids (debris) to the bottom of the sump. Generally, the sump 160 is sized to a depth and volume to provide for the passive separation and facilitate the active separation. That is, the sump 160 has a sufficient depth so that in view of the anticipated sizing of the removed coating (debris) and the difference in density of the debris and the water, the desired size pieces of debris sink to the bottom of the sump within 3 minutes and in some configurations less than one minute. In addition, the sump 160 is sized to retain a sufficient volume of "runoff" so that the liquid (water/runoff) in the sump is not so agitated that passive separation (settling) is substantially reduced. That is, it is typically more cost effective to employ passive separation than active separation. However, in view of the required time for complete passive separation, the present system contemplates the use of both passive and active separation.

The sump 160 includes a debris retention surface 164 for terminating the settling of the settleable debris. In certain configurations, the debris retention surface 164 is a bottom of the sump. In an alternative configuration, the debris retention surface 164 is a relatively fine mesh grid or layer, having a porosity selected to preclude passage of debris to be removed from the sump 160. In one configuration, the sump 160 has a depth of 4 feet and a length of approximately 40 feet.

In the passive, gravity-based, separation, the debris (such as the removed coating, or portions of the removed coating) entrained in the runoff are denser than the water (spray water) and thus upon being washed or falling to the sump 160, settle through the water to be located along the debris retention surface 164, such as the bottom of the sump. This sinking of the debris occurs in real time (usually less than 30 seconds and is typically particulate matter greater than 0.25 inch).

The passive separation employs the natural settling of the denser, often larger, material of the removed coating (debris) settling to the debris retention surface 164, or bottom, of the sump 160 and a conveyor 166 for transporting the settled debris from the bottom of the sump. The conveyor 166 includes at least one head pulley 168, a tail pulley 170 and a plurality of idlers 172 intermediate the head pulley and the tail pulley about which a chain 174 is disposed. While one set of head and tail pulleys 168, 170 is set forth, it is understood the conveyor 166 can include a plurality of sections and hence plurality of head and tail pulleys, such as to facilitate elevations changes in the conveyor.

The chain 174 includes a plurality of paddles or flights 176. The flights 176 are sized engage and retain the debris that sinks to the debris retention surface 164 (or bottom) of the sump 160. The conveyor 166 further includes an inclined portion or chute 178, drawing the debris captured in the conveyor up out of the sump. In one configuration, the conveyor 166 directly passes the debris collected from the debris retention surface 164 of the sump 160 into the disposal bin 92. Any entrained water with the debris in the conveyor 166 is drawn by gravity back along the chute 178 and into the sump 160.

The conveyor 166 is located to pass at least a portion of the conveyor along the debris retention surface 164, or bottom, of the sump 160, where the conveyor engages and begins transport of the settled debris. While the debris retention surface 164 of the sump 160 can be sloped or shaped to concentrate the settled debris in certain portions or locations, it is contemplated the debris retention surface of the sump can be horizontal, wherein the conveyor passes along the substantially the length of the horizontal portion.

Thus, the paddles 176 engage debris that has settled to the debris retention surface 164 and transport the debris up out of the sump 160 and into the disposal bin. While the present system has been set forth in terms of a drag or paddle conveyor 166, it is understood that any of a variety of conveyor mechanisms can be used such as, but not limited to screw conveyor or belt conveyors.

In contrast to the settling of the passive separation, the active separation includes an imparted energy to implement the separation of the removed coating (debris) from the water, such as a centrifuge or pressure across a filter media.

In one configuration, the active separation system 80 is provided by a vacuum filter 82. The vacuum filter 82 is fluidly connected to the sump 160 by a transfer line 84, wherein an inlet of the transfer line is at a level in the sump selected to inhibit the entrainment of sediment and promote the passive separation.

In one configuration, the vacuum filter 82 is a commercially available vacuum filter, which is modified to accommodate the present system. Generally, the vacuum filter 82 employs a disposable filter media 86 including non-woven media (such as roll filter media from 3M Filters, Pentair) and creates a pressure differential across the filter media to draw the water through the filter media and capture the particulates on the media. While disposable filter media is set forth in the example, it is understood, the filter media can be cleanable and reusable, however this can adversely increase the cost of the remediation.

In the vacuum filter 82, the filter media 86 is provided on a roll 88, such as a supply roll, wherein the filter media is conveyed along the vacuum filter to a take up reel 90 or in one configuration a disposal bin 92. Thus, the vacuum filter 82 draws the water from above the filter media 86 to the below the filter media.

In the present system, the vacuum filter 82 includes at least one and in one configuration a plurality of air traps or gas or vapor bleeds/draws 94 to extract entrained or trapped air from the water. The entrained air is generally in the form of bubbles that are barely visible or not visible to the naked eye. It is believed these minute bubbles aggregate until a sufficiently large bubble is formed that then ascends in the vacuum filter 82 and causes the filter media 86 to dislodge from the operating orientation. It is believed these minute bubbles are introduced into the water as a result of the high pressure spraying and relatively short (less than 10 minute) resident time in the sump 160. Thus, by incorporating the bleeds/traps 94, the bubbles aggregate and are removed or are removed prior to detrimental aggregation, so that a sufficiently large bubble cannot aggregate and disrupt operation of the vacuum filter 82, such as by allowing water to bypass the filter media 86. In one configuration, the traps 94 are located at the low pressure side of the filter media 86.

As the debris collects on the filter media 86, a filter cake is formed on the upper, unfiltered side of the filter media. The vacuum conveyor 82 is configured to transport the filter cake to the disposal bin 92. Depending on the constituents of the coating, both the filter media 86 and the filter cake can be deposited in the disposal bin 92 or just the filter cake.

Once the water has passed through the vacuum filter 82, the water is passed through a series of downstream filters 100. In one configuration, the water passed through a nominal 25 micron filter 102 to a nominal 1 micron filter. The water then passes to an absolute 1 micron filter and then to an absolute 0.5 micron filter 104.

Depending on the local regulations relating to discharge of the filtered water, the water can then be passed through a series of charcoal filters 106, such as two, three, four or more charcoal filters. The water can then be discharged to the local municipality or can be recirculated, as set forth below in a closed loop system, to the high pressure spray system 40.

Depending on the sizing of the system including anticipated throughput and necessary jetting to remove the coating, the present system can be in a closed loop configuration or an open loop configuration.

In the open loop configuration, the system draws water from an existing reservoir, or public utility or supply, wherein the water is pressurized, impacted with the pipe section, passed through the passive and active filtration and discharged in compliance with local, state and federal regulations.

In the closed loop configuration, the filtered water is pumped from the active separation system 80 to the high pressure spray reservoir 42 or to a holding tank for subsequent introduction to the high pressure spray system 40. In some configurations, the holding tank retains between 250 gallons and 10,000 gallons, wherein a 5,000 gallon holding tank is believed sufficient. It is contemplated, that depending on the operating parameters of the system that a certain percentage of make-up water may need to be added to the system. Typically, such make-up water is less than 20%, and often less than 10% and in certain configurations less than 5% to 1% of the flow.

In one configuration of the present system, the mixture of the spray liquid and solids, includes solids ranging from particulates, typically insoluble, that form a slurry with the spray and solids having an average mean size greater than approximately 0.125 inches to approximately 6 inches or more that collect in the sump 160.

As seen in FIG. 36, in a portable configuration, the enclosure 20 with the support stand 200 and spray head 50 (with robotic arm 70 or fixed spray head) are located on a first trailer 240. Depending on the anticipated size of the pipe sections 10 to be cleaned, the first trailer 240 can also include the sump 160. A second trailer 250 includes the motor 46 and pump 44 for generating the high pressure water. Also, the second trailer 250 or a third trailer 260 can include the vacuum separator 82 for providing active separation. Depending on the location of the sump 160, the conveyor 166 can transport the passively separated debris to the disposal bin 92, which can be the third trailer 260 or incorporated on the third trailer. It is understood any of the trailers can include the air filtration system 180 as necessary to retain and capture any debris introduced into the air.

It is further contemplated the portable configuration can employ the closed loop configuration, wherein the trailers include the active separation system 80 including the downstream filters 100, such that the water is sufficiently cleaned so that it can pass through the high pressure spray system 40 without damaging the high pressure spray system. Thus, one of the trailers can include the reservoir 42 for retaining the liquid, water, wherein the reservoir is fluidly connected to the active separation system 80. The trailers include electrical communication and fluid communication, such as hoses or pipes, to provide a closed loop system for the water.

Thus, the portable configuration provides for transporting the system to the location of the excavated pipe sections 10 so that the pipe sections do not need to be wrapped for ground transportation and subsequently trucked or taken by rail to the site of the remediation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method comprising:
   (a) impacting a pressurized liquid stream against an exterior surface of a pipe section located within an enclosure to form a mixture having entrained debris, wherein the mixture flows to a sump, the sump including a debris retention surface;
   (b) extracting a portion of the mixture from the sump;
   (c) passing the extracted portion of the mixture through a filter to capture a portion of the entrained debris on a filter media; and
   (d) engaging a conveyor with debris accumulated on the debris retention surface and transporting the accumulated debris from the sump to an elevation in the enclosure above the sump.

2. The method of claim 1, further comprising applying a negative pressure to an interior of the enclosure by withdrawing air from the enclosure and filtering a portion of the withdrawn air.

3. The method of claim 1, further comprising passing the pressurized liquid stream from a spray head and remotely controlling a position of the spray head.

4. The method of claim 1, wherein passing the extracted portion of the mixture through the filter includes passing the extracted portion of the mixture through a vacuum filter.

5. A method for cleaning an exterior surface of a pipe section, the exterior surface having a coating, the method comprising:
   (a) impacting a pressurized stream, from a nozzle of a spray head, with the exterior surface of the pipe section to remove at least a portion of the coating from the exterior surface of the pipe section and form a mixture of liquid and entrained debris, the pipe section being located within an interior of an enclosure, the interior of the enclosure having a floor at a lower elevation than the pipe section, the interior of the enclosure including a sump located at a lower elevation than the floor, the sump defining a debris retention surface at an elevation lower than the floor, the debris retention surface located within the interior of the enclosure;
   (b) passing a portion of the mixture from the sump to a liquid filtration system fluidly connected to the sump, the liquid filtration system having a filter media configured to remove a portion of the entrained debris from the mixture to form a liquid stream; and
   (c) conveying a further portion of the debris from the sump to transport the further portion of the debris out of the sump to an elevation above the floor within the enclosure.

6. The method of claim 5, wherein conveying the further portion of the debris includes conveying the further portion of the debris along a first potion of the conveyor in the sump and along a second portion of the conveyor out of the sump.

7. The method of claim 5, further comprising replacing the filter media.

8. The method of claim 5, further comprising locating the enclosure on a trailer.

9. The method of claim 5, further comprising moving the spray head relative to the pipe section with a robotic arm.

10. The method of claim 5, further comprising withdrawing air from the enclosure to pass the withdrawn air through an air filtration system external to the enclosure.

11. A method for cleaning an exterior surface of a pipe section, the exterior surface having a coating, the method comprising:
   (a) locating the pipe section in an enclosure defining an interior, the interior sized to enclose at least a portion of the pipe section, the interior of the enclosure having a floor at an elevation lower than the enclosed portion of the pipe section, the enclosure including a sump at an elevation lower than the floor, the sump defining a debris retention surface at a lower elevation than the floor;
   (b) impacting a pressurized stream from a spray head having at least one nozzle, to impact the exterior surface of the enclosed portion of the pipe section to remove at least a portion of the coating from the exterior surface and form a mixture of the liquid and entrained debris;
   (c) collecting the mixture in the sump;
   (d) passing a portion of the mixture to a vacuum filter, the vacuum filter including a disposable filter media;
   (e) generating a pressure differential across the disposable filter media to remove a portion of the entrained debris from the mixture to form a liquid stream;
   (f) passing the liquid stream to a downstream filter; and
   (g) passing a further portion of the entrained debris from the sump to a higher elevation in the enclosure.

12. The method of claim 11, further comprising vacuum bleeding the vacuum filter.

13. The method of claim 11, wherein passing the further portion of the entrained debris from the sump includes conveying the further portion of the entrained debris on a conveyor located within the interior of the enclosure, the conveyor having a first portion and a spaced apart second portion, wherein the conveyor transports the further portion of the entrained debris out of the sump to an elevation above the floor.

14. The method of claim 11, further comprising locating the enclosure on a trailer.

15. The method of claim 11, further comprising moving the spray head relative to the pipe section with a robotic arm.

16. The method of claim 11, further comprising withdrawing air from the enclosure to pass the withdrawn air through an air filtration system external to the enclosure.

* * * * *